United States Patent
Sato

(10) Patent No.: US 6,728,758 B2
(45) Date of Patent: *Apr. 27, 2004

(54) AGENT FOR PERFORMING PROCESS USING SERVICE LIST, MESSAGE DISTRIBUTION METHOD USING SERVICE LIST, AND STORAGE MEDIUM STORING PROGRAM FOR REALIZING AGENT

(75) Inventor: Akira Sato, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,273

(22) Filed: Jul. 7, 1998

(65) Prior Publication Data

US 2001/0039562 A1 Nov. 8, 2001

(30) Foreign Application Priority Data

Dec. 16, 1997 (JP) .......................... 09-345955

(51) Int. Cl.[7] .......................... G06F 15/163
(52) U.S. Cl. ............... 709/206; 709/203; 370/94.1
(58) Field of Search ................ 709/200, 203, 709/206, 218, 202, 217, 224, 226, 227, 228, 229; 370/404, 94.1; 379/59

(56) References Cited

U.S. PATENT DOCUMENTS

| | | | | |
|---|---|---|---|---|
| 5,329,619 A | * | 7/1994 | Page ......................... | 709/200 |
| 5,367,635 A | * | 11/1994 | Bauer ....................... | 709/201 |
| 5,499,364 A | * | 3/1996 | Klein ........................ | 709/200 |
| 5,533,026 A | * | 7/1996 | Ahmadi et al. ........... | 370/94.1 |
| 5,548,646 A | * | 8/1996 | Aziz et al. ................ | 380/23 |
| 5,561,769 A | * | 10/1996 | Kumar et al. ............. | 709/200 |
| 5,581,596 A | * | 12/1996 | Hogan ....................... | 379/59 |
| 5,586,121 A | * | 12/1996 | Moura et al. ............. | 370/404 |
| 5,850,517 A | * | 12/1998 | Verkler et al. ............ | 709/202 |
| 5,898,832 A | * | 4/1999 | Feridun ..................... | 709/203 |
| 6,108,646 A | * | 8/2000 | Mohri et al. .............. | 707/1 |
| 6,233,601 B1 | * | 5/2001 | Walsh ....................... | 709/202 |
| 6,263,358 B1 | * | 7/2001 | Lee et al. .................. | 709/100 |
| 6,266,805 B1 | * | 7/2001 | Nwana et al. ............. | 717/104 |
| 6,424,973 B1 | * | 7/2002 | Baclawski ................. | 707/102 |
| 6,498,795 B1 | * | 12/2002 | Zhang et al. .............. | 370/400 |

OTHER PUBLICATIONS

Bayardo Jr. et al., InfoSleuth: Agent –Based Sematic Integration of Information in Open and Dynamic Environments, Jun. 1997, ACM SIGMOD international, vol. 26, pp. 195–206.*

* cited by examiner

Primary Examiner—Hosain Alam
Assistant Examiner—Khanh Quang Dinh
(74) Attorney, Agent, or Firm—Staas & Halsey LLP

(57) ABSTRACT

A message distribution method for distributing a message among a plurality of software products distributed in a network realizes an efficient intelligent distribution environment. When a message is communicated among distributed software products, a service list defined by a combination of data of destination information of the message and process information specified by the message is added to the message. The portion of the service list processed by a destination software product is deleted, and the service list is rewritten as necessary. Thus, the message with the service list is transmitted from a software product to another software product.

38 Claims, 29 Drawing Sheets

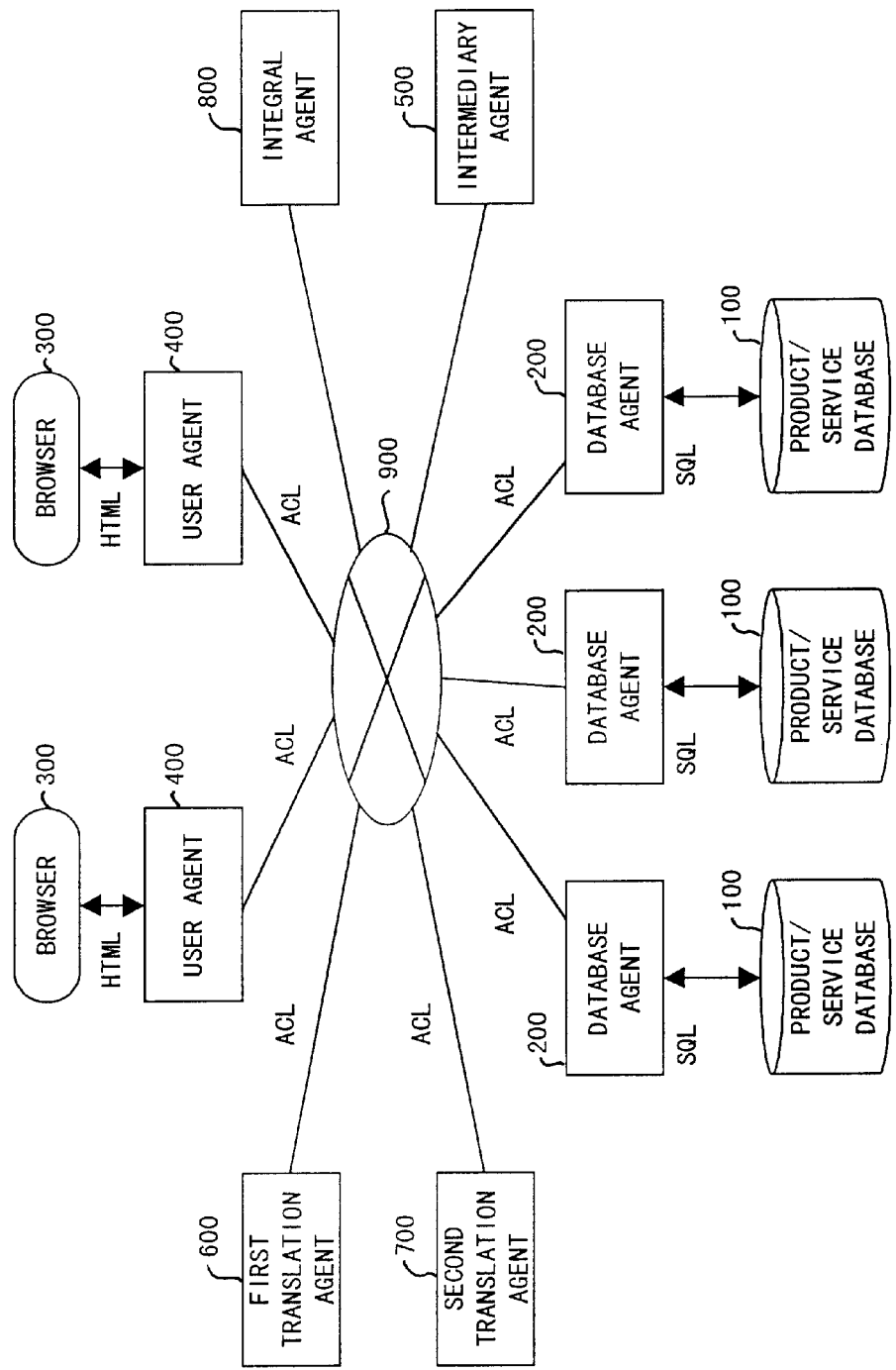
F I G. 5

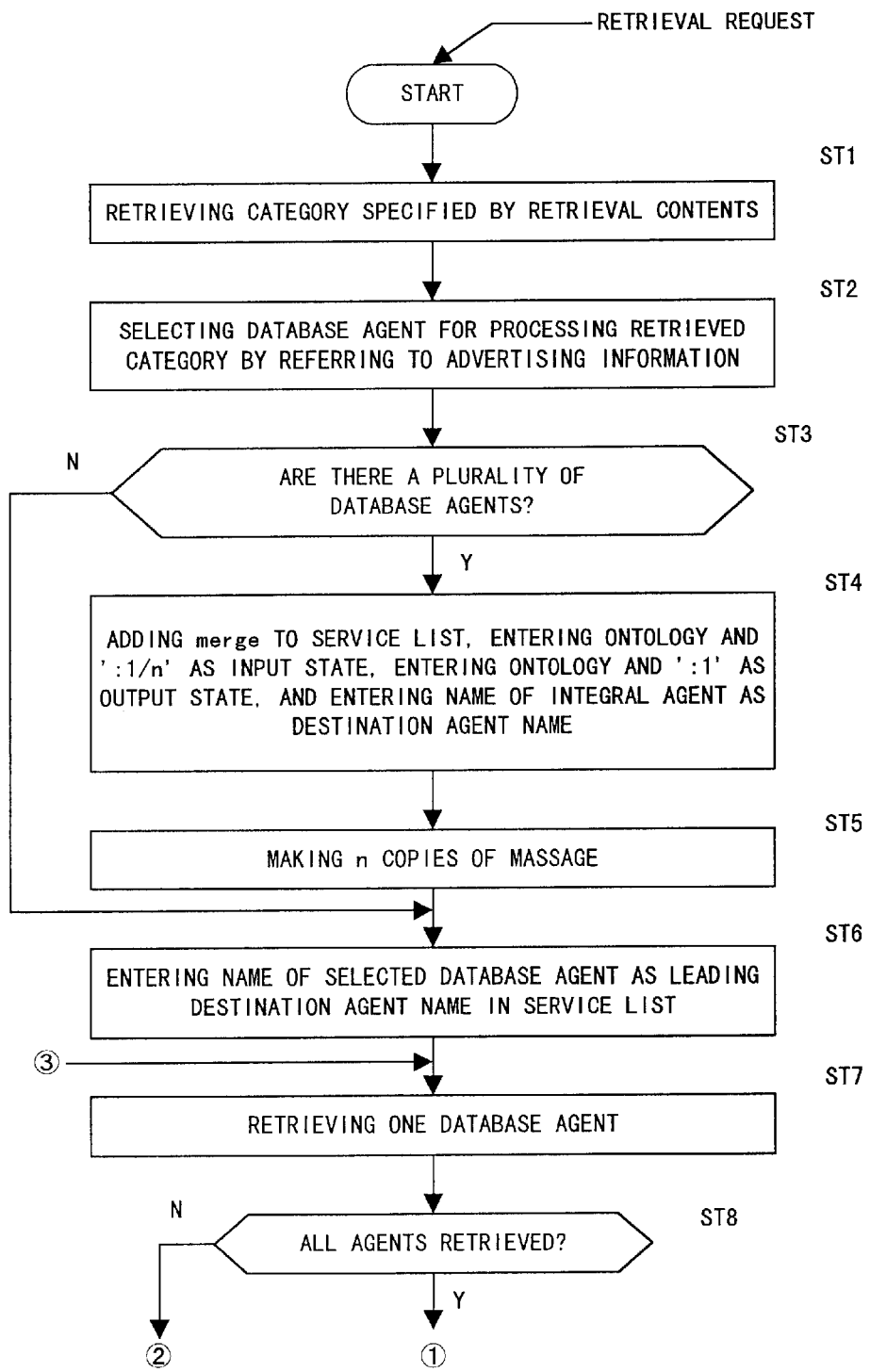
F I G. 10

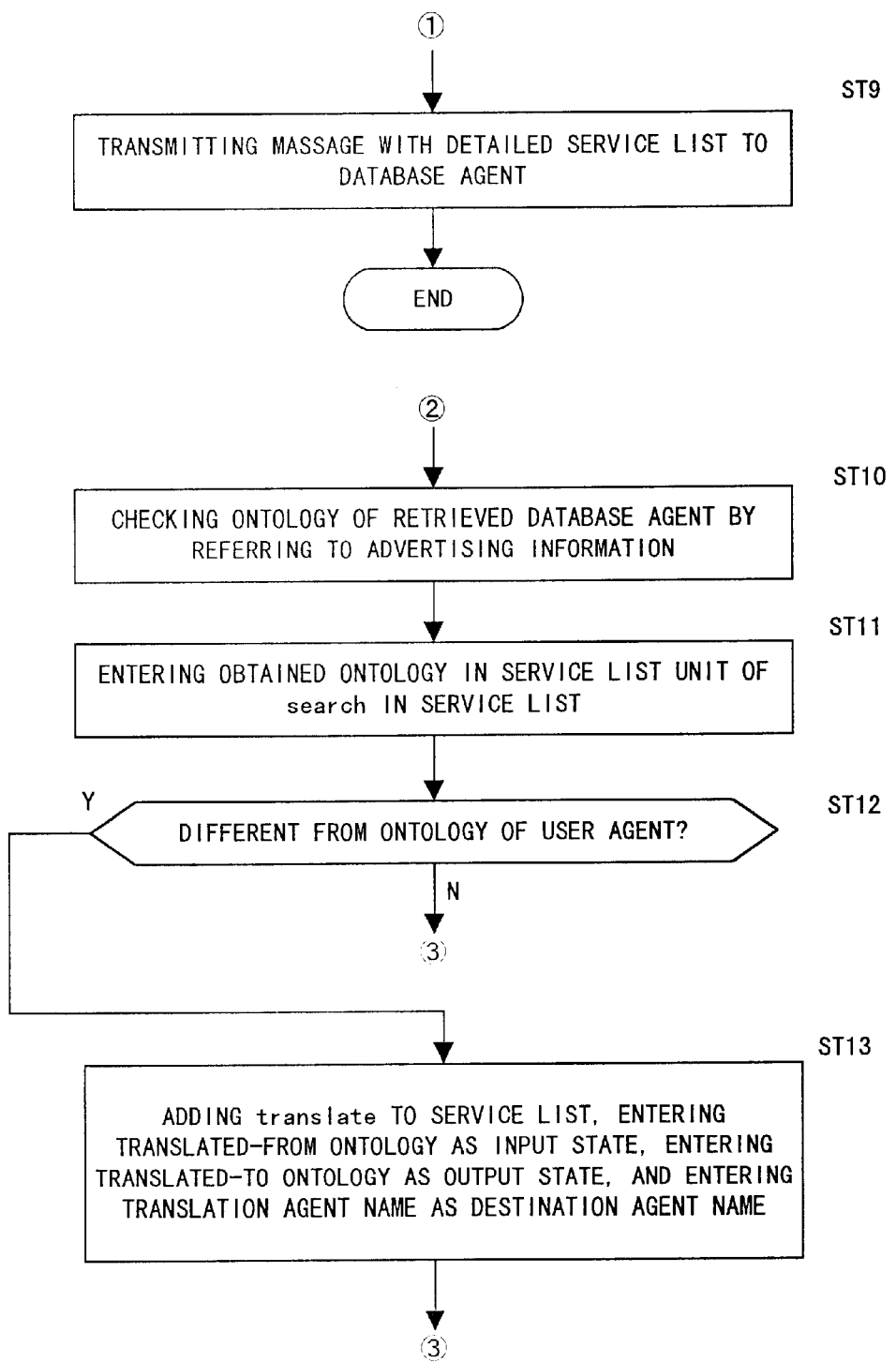
F I G. 1 1

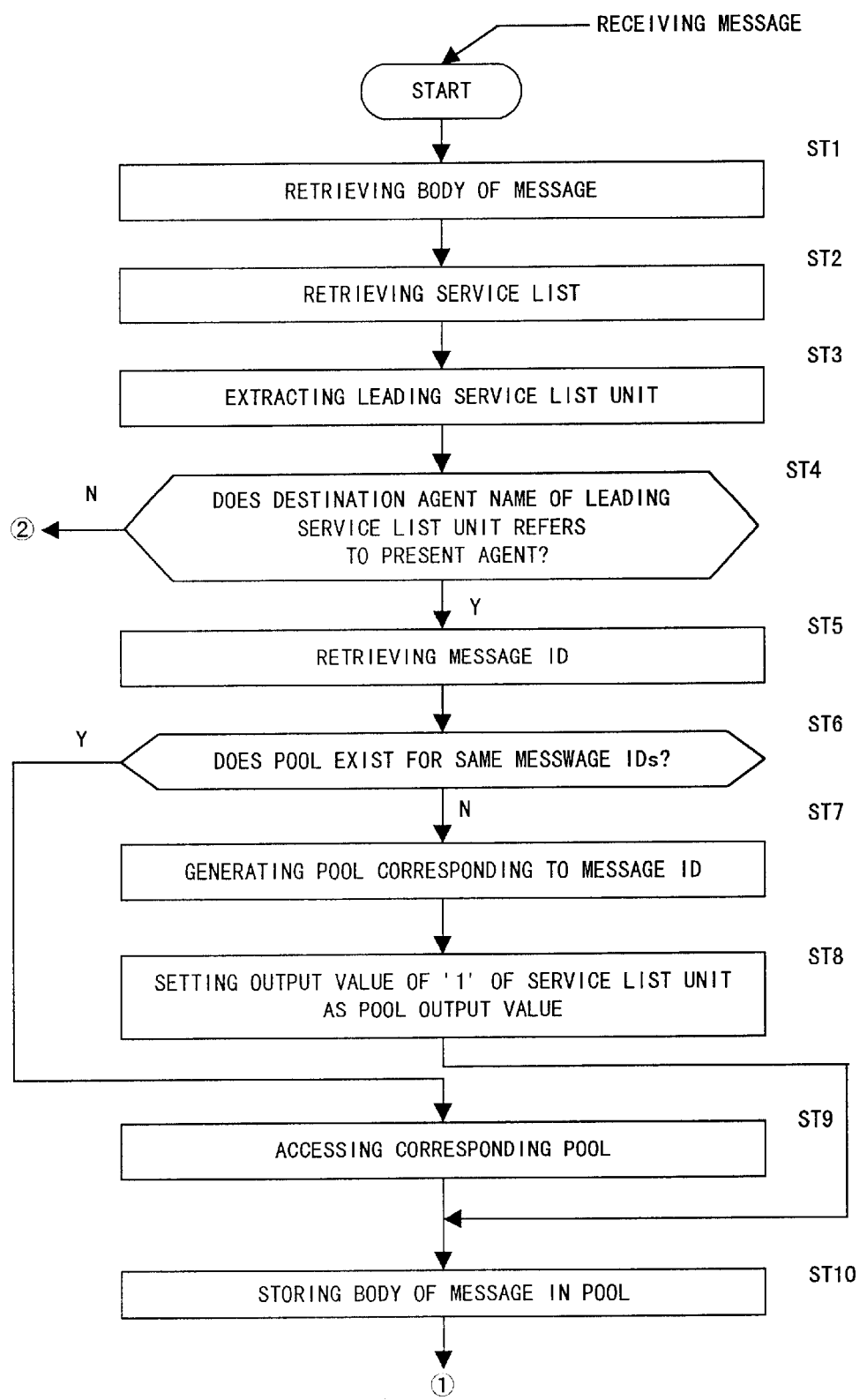
F I G. 1 3

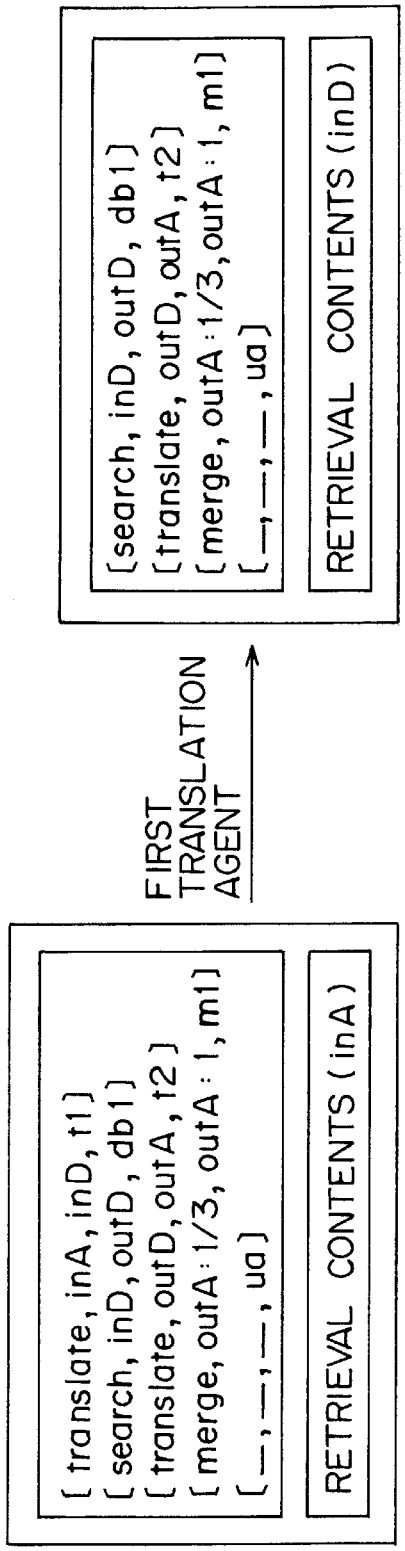
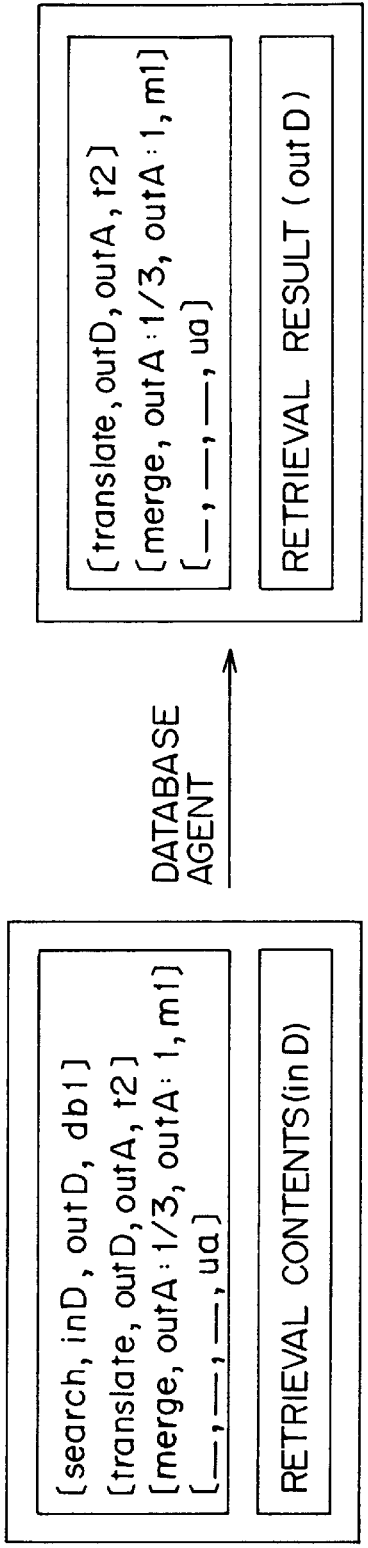
FIG. 18A
FIG. 18B

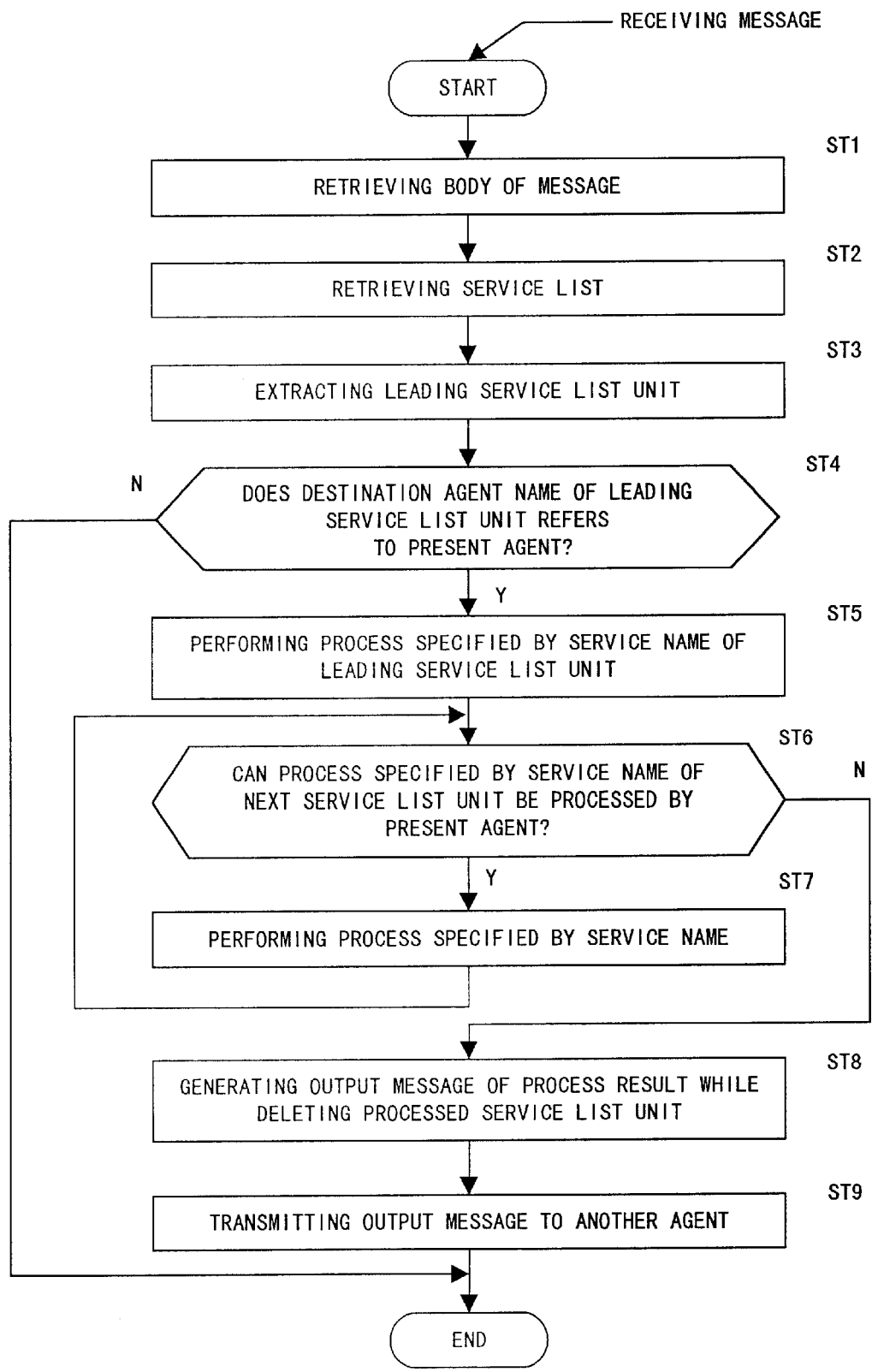
F I G. 2 1

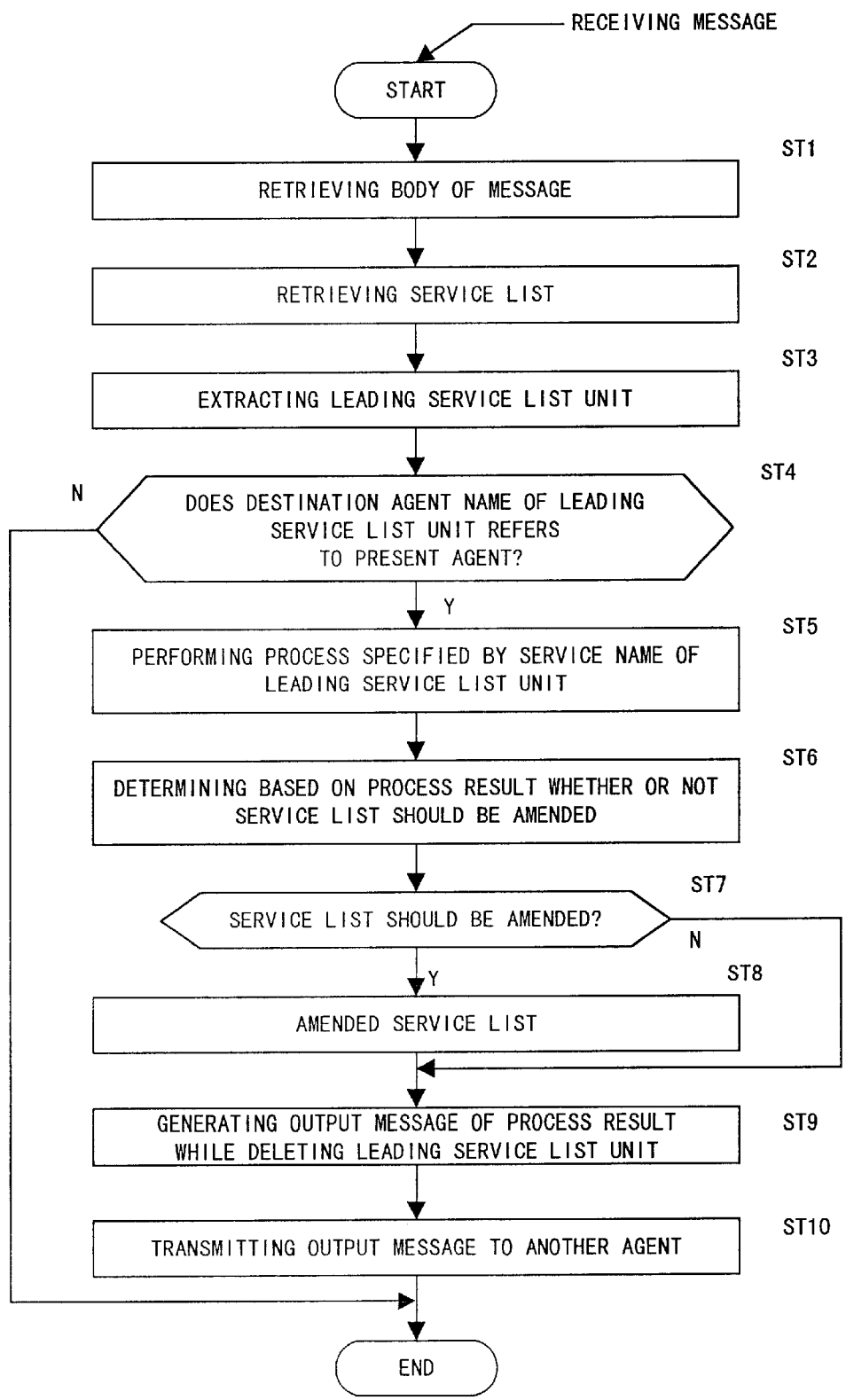
F I G. 2 5

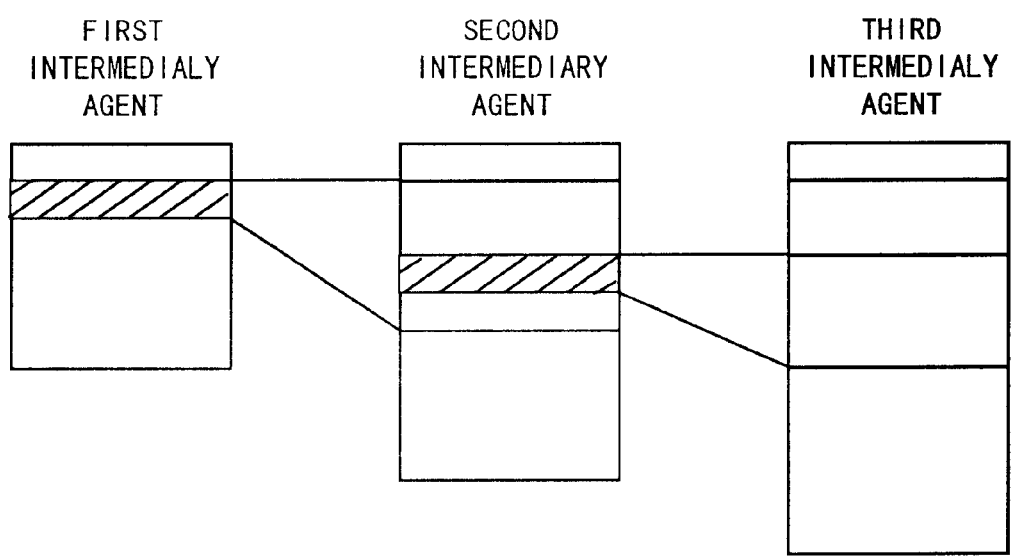
F I G. 26

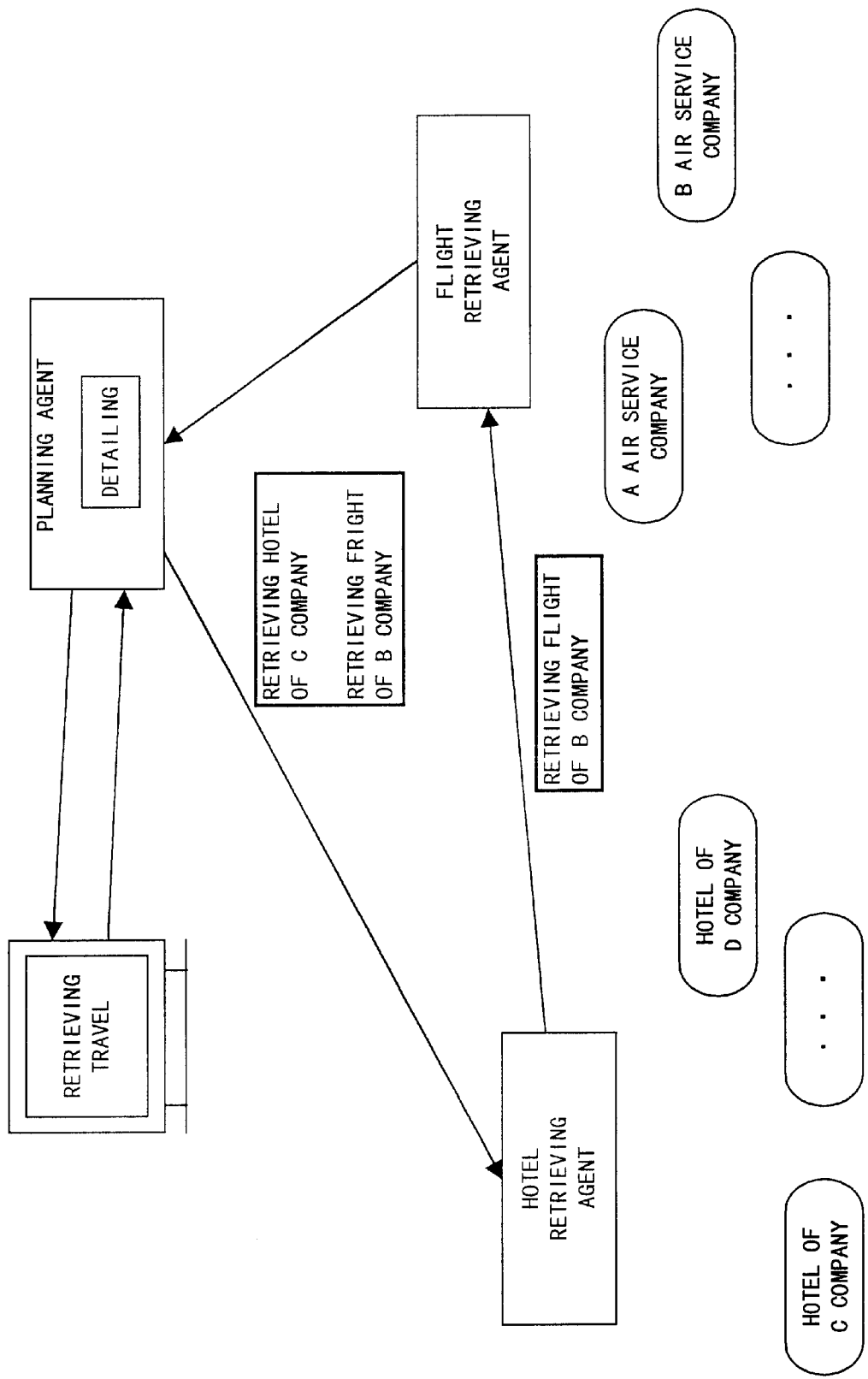
F I G. 27

AGENT FOR PERFORMING PROCESS USING SERVICE LIST, MESSAGE DISTRIBUTION METHOD USING SERVICE LIST, AND STORAGE MEDIUM STORING PROGRAM FOR REALIZING AGENT

BACKGROUND OF THE INVENTION

1. Field of the Invention

The present invention relates to a message distribution method for distributing a message communicated by plural software products to be distributed through a network; an agent used in a multiple agent system; and a program storage medium for storing a program for realizing the agent. Specifically, it relates to a message distribution method capable of realizing an efficiently distributed intelligent environment; an agent capable of realizing the efficiently distributed intelligent environment; and a program storage medium for storing a program used to realize the agent.

2. Description of the Related Art

An agent system is based on an autonomous software technology and links software products using a common language (for example, an ACL (agent communications language)) so that the computer system can prompt the user for a request and assemble operations. With the growing popularity of Internet, it is expected that various agent processes can be realized by integrally processing information distributed through Internet.

However, to link software products in the agent system, an agent for providing a service in response to a request from a requester can be exactly located. Furthermore, the ACL only defines the grammar of a message, but does not define any word indicating the contents of the message. Therefore, the function of translating a word system is also required.

A multiple agent system basically includes an information requester agent and an information provider agent. Conventionally, there has been an intermediary agent provided between the above described agents, and assigned the function of selecting an agent for providing a service in response to a request from a requester, and the translation function to absorb the difference in word system among agents (referred to as 'ontology'). The intermediary agent has also been assigned the function of integrating the answers transmitted from a plurality of information provider agents.

The Inventor of the present invention has filed an application for a patent of a virtual catalog system capable of displaying catalog information such as product information and service information to be distributed through a network as if it were a single set of catalog information, and also has published the virtual catalog system at the meetings of technological societies. In the agent system of this virtual catalog system, an intermediary agent is provided between a user agent (for connecting the agent system with a browser) and a database agent (for connecting the agent system with a database) as shown in FIG. 1. The intermediary agent is assigned the function of selecting a database agent for managing catalog information required by the user agent, and also the translation function to absorb the difference in word system among agents. The intermediary agent is also assigned the function of integrating the answers transmitted from a plurality of database agents.

That is, in the virtual catalog system shown in FIG. 1, the database agent advertises the ability of the virtual knowledge base obtained by abstracting the database for the intermediary agent. As a result, the database agent outputs information about the category which can be processed by the virtual knowledge base, the ontology used in the virtual knowledge base, etc.

With the above described configuration, when the user issues a retrieval request through a browser, the user agent converts the retrieval request into an ACL message and transmits the converted message to the intermediary agent. Upon receipt of the message, the intermediary agent selects from the received advertising information the database agent which can process the ACL message, translates the word in the ACL message into the word which can be processed by the selected database agent, and then transmits the ACL message to the database agent.

Upon receipt of the ACL message, the database agent generates an SQL (structured query language) command from the ACL message, searches the database, assembles the search results as an ACL message, and transmits the obtained result to the intermediary agent. Upon receipt of the ACL message obtained as the search result, the intermediary agent integrates the answers, that is, the search results, transmitted from a plurality of database agents as a single message, and transmits it to the user agent.

Thus, the virtual catalog disclosed by the Inventor of the present invention realizes catalog information such as product information and service information to be distributed through a network as if it were a single set of catalog information. For the realization, an intermediary agent is provided between a user agent and a database agent. The intermediary agent is assigned the function of selecting a database agent for managing catalog information required by the user agent, and also the translation function to absorb the difference in word system among agents. The intermediary agent is also assigned the function of integrating the answers transmitted from a plurality of database agents.

Certainly, it is a considerably effective method to design the multiple agent system by providing an intermediary agent for performing an intermediary process between agents, and allowing the intermediary agent to have the function of selecting an agent for providing a service in response to a request from a requester, the translation function to absorb the difference in word system between agents, and the function of integrating answer results.

However, with the above described configuration, the following problem occurs.

That is, all functions such as the function of selecting an agent, translating a message for communications among selected agents, integrating a plurality of answer messages, etc. are concentrated on the intermediary agent. Therefore, the load of the intermediary agent becomes large, and a large volume of communications are established among the agents with a poor response.

Furthermore, a message is always passed through the intermediary agent even if it is not necessary to use the intermediary agent. For example, when it is not necessary to integrate answer messages, the messages have to pass through the intermediary agent. This refers to a wasteful system.

To solve the problem, a plurality of functions of the intermediary agent are divided to be assigned to different agents. For example, as shown in FIG. 2, the function of translating a message and the function of selecting an agent can be processed through an agent other than the intermediary agent.

However, in this method, an operation of 'selecting an object agent and transmitting a message to the agent' is performed. Therefore, it is necessary to request an agent having the function of selecting an agent to select an agent to be accessed, request an agent having the function of translating a message to translate a message, and then transmitting the translated message to the agent which selected the agent. Thus, the operation cannot be performed in one step when it is performed by a plurality of agents.

The intermediary agent for managing each of the functions should communicate several times with a representative intermediary agent, thereby increasing the frequency of communications.

SUMMARY OF THE INVENTION

The present invention has been developed based on the above described background, and aims at providing a message distribution method capable of realizing an efficiently distributed intelligent environment; an agent capable of realizing the efficiently distributed intelligent environment; and a program storage medium for storing a program used to realize the agent.

An agent used in a multiple-agent system according to the present invention includes a generation unit for generating a service list defined by a combination of process information specified by a message and destination information about the message; and a transmission unit for adding the service list to the message and transmitting the message to another agent.

An agent according to the present invention includes a reception unit for receiving a message transmitted from another agent; an extraction unit for extracting a service list which is added to the message received by the reception unit, and is defined by a combination of destination information about the message and process information specified by the message; a detail unit for detailing the service list extracted by the extraction unit according to the knowledge about an agent for performing a process; and a transmission unit for adding the detailed service list to the message and transmitting the message to another agent.

A further agent according to the present invention includes a reception unit for receiving a message transmitted from another agent; an extraction unit for extracting a service list which is added to the message received by the reception unit, and is defined by a combination of data of destination information about the message and process information specifying a process to be performed; an execution unit for executing the process specified by process information corresponding to the destination information when leading destination information in the service list extracted from the extraction unit specifies a present agent; a deletion unit for deleting the combination of the data of the service list relating to the process to be executed by the execution unit: and a transmission unit for adding a service list from which the combination of the data has been deleted to a message of an execution result from the execution unit, and transmitting the message to another agent.

For example, in a multiple-agent system in which each of the above described agents is used, a service list is generated according to a process request message from a user, and the service list is added to the message and transmitted to the second agent. The second agent details the received service list based on the knowledge about an agent for performing a process, generates a service list in a description format at a detail level at which the concrete contents of a process, the position where the process is performed, etc. are defined, and transmits the service list to the third agent. The third agent performs a process specified by the leading process information in the received service list, deletes the combination of data relating to the performed process from the service list, and transmits the service list to another agent.

As described above, according to the present invention, a process to be performed and the information specifying an agent for performing the process are added as a service list to a message, and the message is sequentially transmitted to agents, and each of the agents performs the process. Thus, the amount of messages communicated between specific agents can be reduced, thereby preventing the efficiency of the processes in the entire system from being deteriorated. Furthermore, since a message is not distributed through an agent which is not directly involved in the process. As a result, the distribution route of a message is not wasted.

BRIEF DESCRIPTION OF THE DRAWINGS

FIG. 5 shows the system to which the present invention is applied;

FIG. 10 is the flow of a process performed by an intermediary agent;

FIG. 11 is the flow of a process performed by an intermediary agent;

FIG. 13 is the flow of a process performed by an integral agent;

FIGS. 18A and 18B show an embodiment of a message;

FIG. 21 is the flow of a process performed by an agent;

FIG. 25 is the flow of a process performed by an agent;

FIG. 26 shows a service list when a detailing process is performed step by step;

FIG. 27 shows detailing a service list;

DESCRIPTION OF THE PREFERRED EMBODIMENTS

Figure 1:
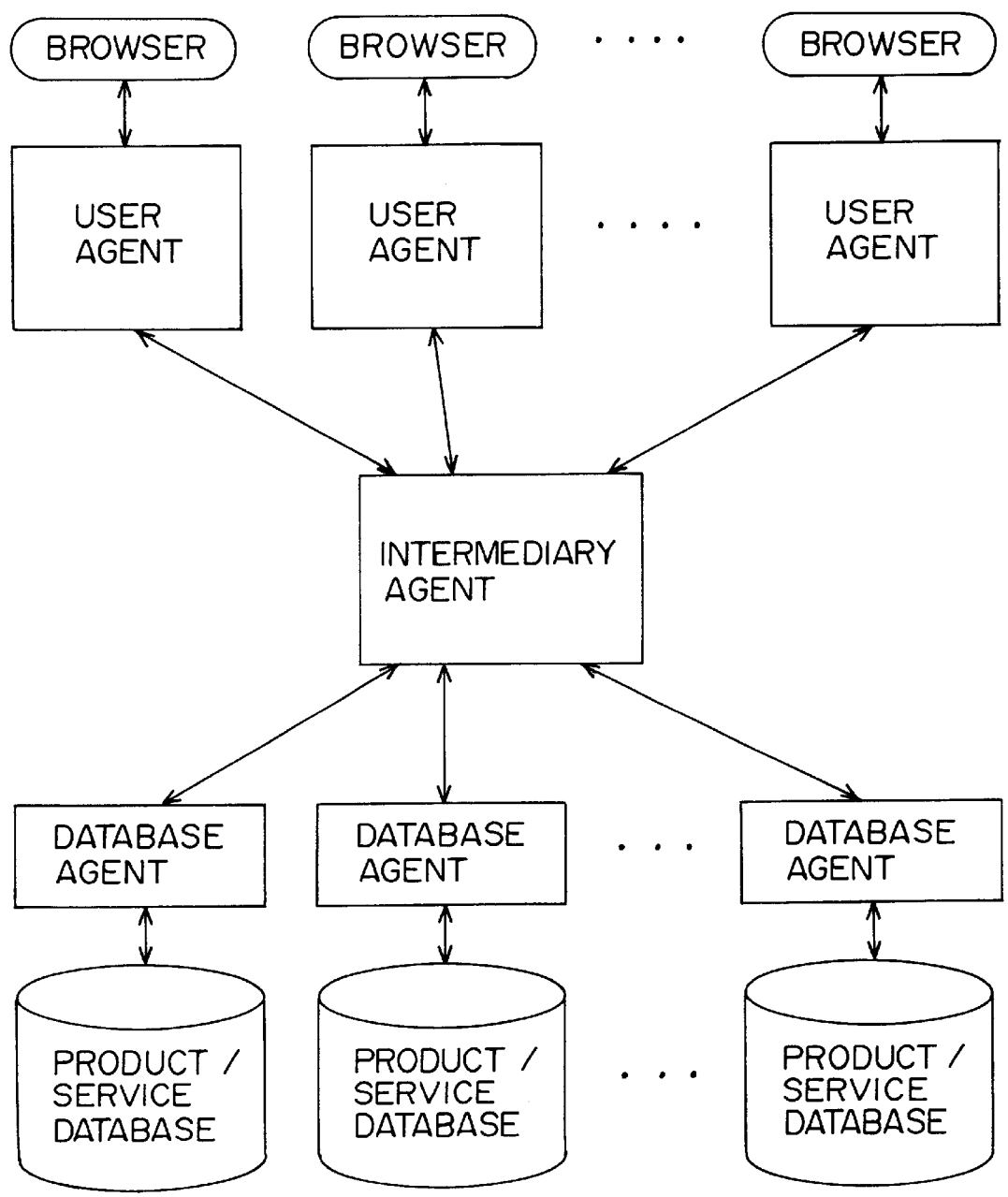
FIG. 1 shows the virtual catalog system.
Figure 2:
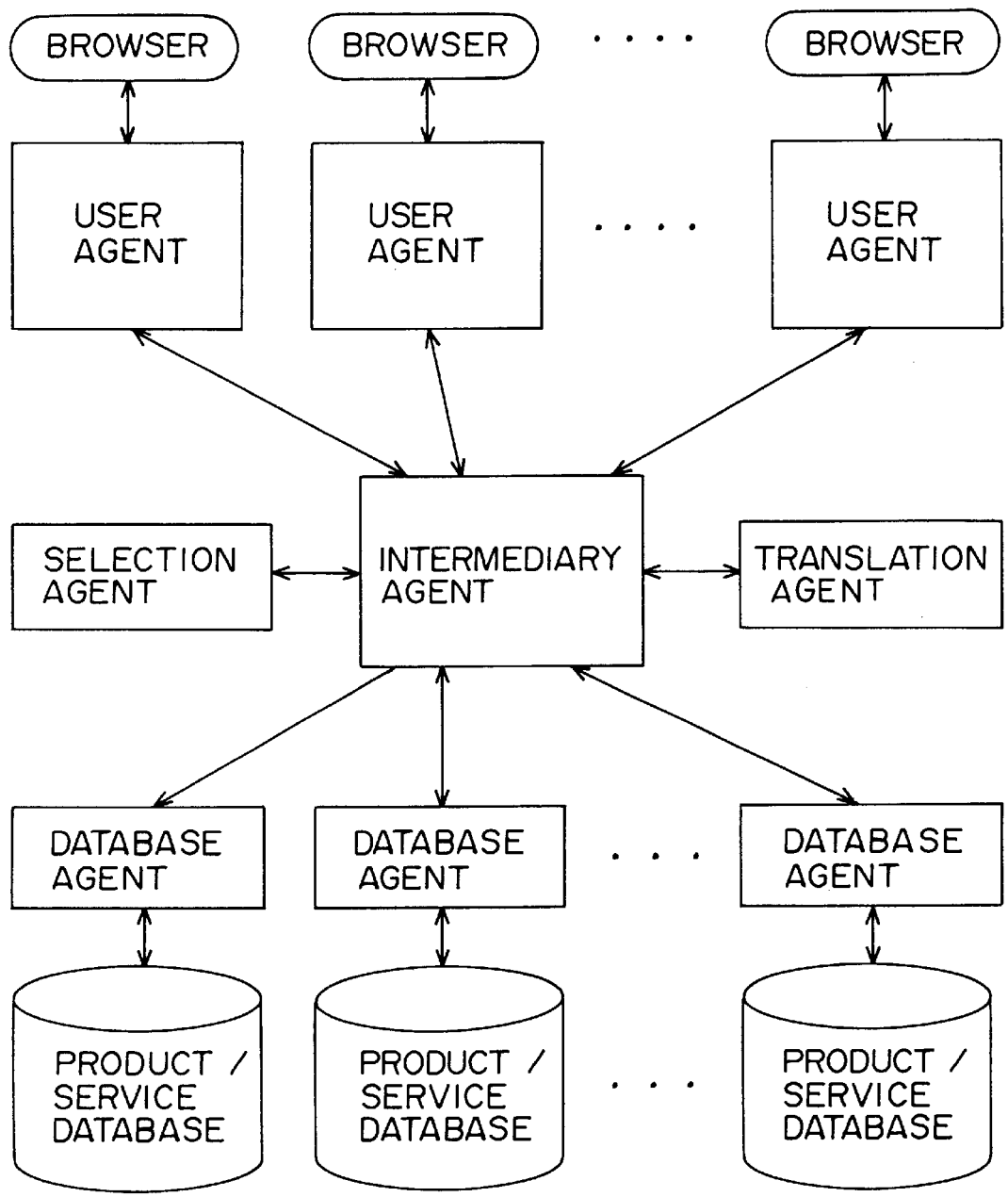
FIG. 2 shows the system in which the function of an intermediary agent is distributed.
Figure 3:
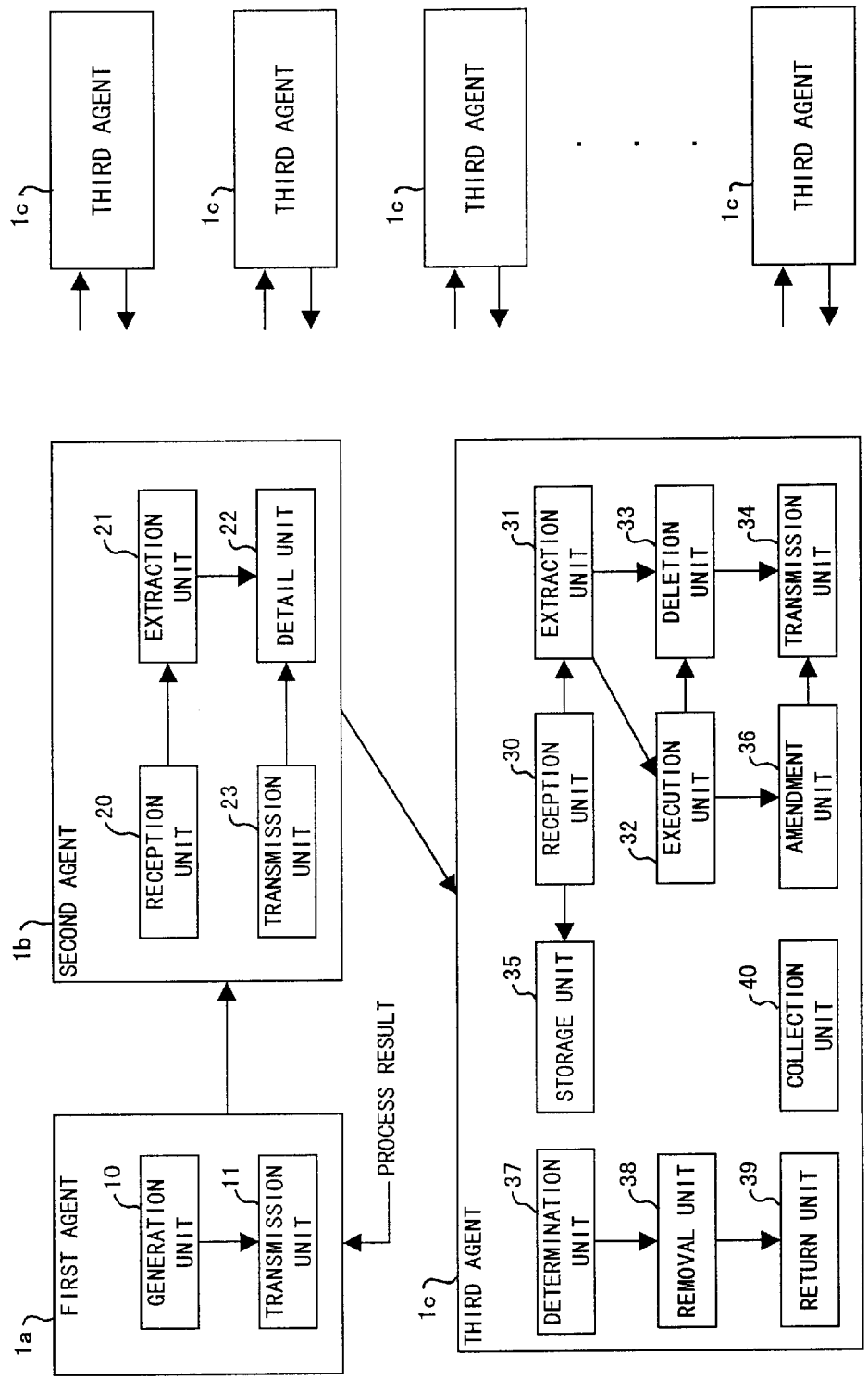
FIG. 3 shows the configuration of the principle of the present invention.

FIG. 3 shows the configuration according to the principle of the present invention.

FIG. 3 practically shows one or more first agent 1a; one or more second agents 1b; and one or more third agents 1c according to the present invention.

The first agent 1a is, for example, a user agent, and generates a prosess request service list in a description format at an abstract level at a process request. The second agent 1b is, for example, an intermediary agent, and embodies the contents of the service list transmitted from the first agent 1a. The third agents 1c are, for example, execution agents for performing a process, and are sequentially activated according to the service list embodied by the second agent 1b, executes the process requested by the first agent 1a, and outputs the process result as an answer.

The first agent 1a includes a generation unit 10 for generating a service list defined by the combination of the destination information about a message to be transmitted to another agent and the process information specified by the message; and a transmission unit 11 for transmitting the service list generated by the generation unit 10 after adding it to the message to be transmitted to the other agent.

The generation unit 10 generates a service list basically in the description format at the abstract level. It generates a service list in the description format at a detail level if possible, or a service list in the description format at the abstract level partly including the detail level.

On the other hand, the second agent 1b includes a reception unit 20 for receiving a message transmitted from another agent; an extraction unit 21 for extracting a service list at the abstract level (possibly including the detail level) added to the message received by the reception unit 20; a detail unit 22 for detailing the service list at the abstract level extracted by the extraction unit 21; and a transmission unit 23 for transmitting to another agent the service list detailed by the detail unit 22 after adding it to the message received by the reception unit 20.

The detail unit 22 details the process to the end, or details the service list with a part of the detailing process committed to a subsequent agent. When a message is transmitted to a plurality of destinations, and when, for example, the process of the service list can be shared among a plurality of agents, the message is copied and the number of copies of the message is recorded on the service list while performing the detailing process.

On the other hand, the third agent 1c includes a reception unit 30 for receiving a message transmitted from another agent; an extraction unit 31 for extracting a service list at the detail level (possibly including the abstract level) added to the message received by the reception unit 30; an execution unit 32 for executing a process specified by the leading process information in the service list when the leading destination information in the service list extracted by the extraction unit 31 specifies the present agent; a deletion unit 33 for deleting the portion of the service list to be executed by the execution unit 32; and a transmission unit 34 for transmitting a service list removed by the deletion unit 33 from the process to be deleted after adding the removed service list to an execution result message of the execution unit 32.

When the number of copies of a message is recorded in the service list extracted by the extraction unit 31, the execution unit 32 executes a process specified by process information after the message has been received according to the number of copies recorded in the service list. When the one or more pieces of process information in the service list after the leading process information can be processed, the execution unit 32 can execute the process specified by the corresponding process information.

Furthermore, the third agent 1c includes a storage unit 35 for storing a message received by the reception unit 30; an amendment unit 36 for amending one or both of the destination information and the process information in the received service list based on the execution result of the execution unit 32 and the knowledge stored in the system; a determination unit 37 for determining whether or not a transmitted message is returned to the present agent by referring to the received service list; a removal unit 38 for removing the process information to be executed by the present agent when a message is returned if the determination unit 37 determines that the message is to be returned to the present agent; a return unit 39 for returning the process information removed by the removal unit 38 to the service list of a message to be removed by the removal unit 38 when the message is returned; and a collection unit 40 for collecting the process state of the message of an agent subordinate to the present agent.

The removal unit 38 can remove from the service list the process information executed by another agent subsequent to the process information to be executed by the present agent.

The functions of the first agent 1a, the second agent 1b, and the third agent 1c can be actually realized by a program. The program is stored in a floppy disk, a disk connected through a line, etc., and then executed by being operated in the memory of a server of a user (client), a server which provides an intermediary service, and a server which searches a database, etc.

With the above described configuration according to the present invention, when a user issues a process request, the generation unit 10 of the first agent 1a generates a service list in the description format at the abstract level to realize the process request. When the transmission unit 11 notifies the second agent 1b of a process request message, it transmits the service list after adding it to the message.

When the reception unit 20 of the second agent 1b receives the process request message from the first agent 1a after the process of the first agent 1a, the extraction unit 21 extracts the service list at the abstract level to be added to the received message. Then, the detail unit 22 details the service list at the extracted abstract level. The transmission unit 23 adds the detailed service list to the message received by the reception unit 20, and transmits the service list to the third agent 1c.

When the reception unit 30 of the third agent 1c receives the process request message from the second agent 1b after the process of the second agent 1b, the extraction unit 31 extracts the service list at the detail level to be added to the received message. When the leading destination information in the extracted service list specifies the present agent, the execution unit 32 executes the process specified by the leading process information in the service list. At this time, the deletion unit 33 deletes the service list portion to be executed by the execution unit 32. When an execution result by the execution unit 32 is obtained, the transmission unit 34 adds a service list removed by the deletion unit 33 from the processes to be deleted to the execution result message of the execution unit 32, and transmits it to the third agent 1c.

Figure 4:
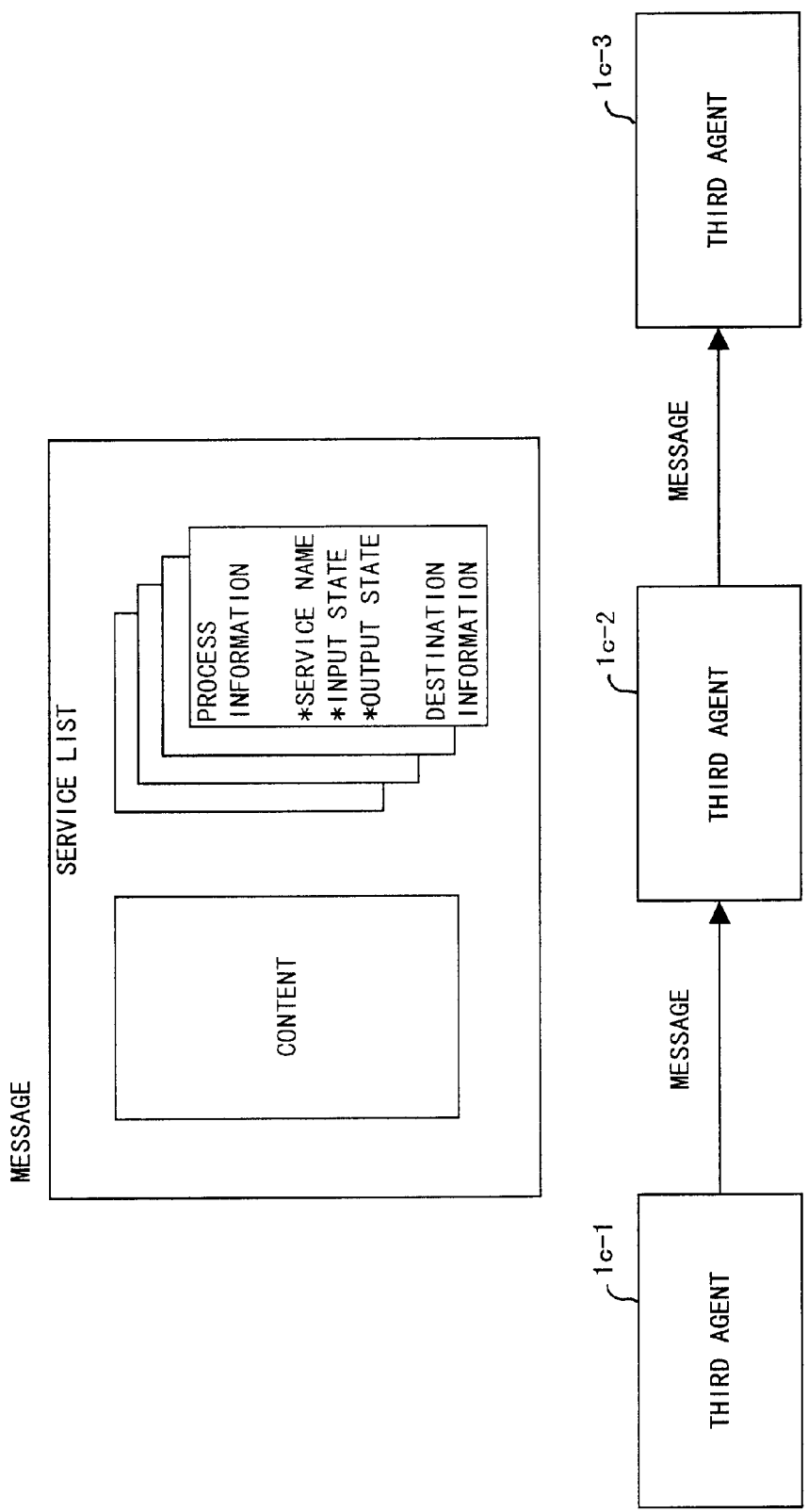
FIG. 4 is a block diagram showing the present invention.

Thus, the third agents 1c-1 through 1c-3 shown in FIG. 4 are activated in the order of the destination information about the service list at the detail level added to a message, and perform the process specified by the process information in the service list (including a service name, an input state, and an output state of a process request). The last activated third agent 1c transmits the process result as an answer to the first agent 1a that has issued the process request according to the destination information in the service list.

Although not shown in FIG. 4, a message ID for identifying the message, the ontology of the message, etc. are added to the message.

When a process specified by process information can be performed by a plurality of third agents, for example, when a plurality of databases are searched, the detail unit 22 of the second agent 1b copies the message, records the number of copies in the service list, and performs the detailing process. Then, the execution unit 32 of the third agent 1c performs the process specified by the process information after the message has been received according to the number of copies recorded in the received service list.

When the execution unit 32 of the third agent 1c can process one or more pieces of process information subsequent to the leading process information in the service list, it performs the process specified by process information on behalf of the third agent 1c which is the destination of the process information.

Furthermore, the storage unit 35 of the third agent 1c stores the message received by the reception unit 30. A service list indicating the behavior of a message is added to the stored message. Therefore, when the system becomes faulty, the fault can be easily and correctly analyzed by referring to the service list.

The amendment unit 36 amends (changing by addition or deletion) one or both of the destination information and the process information in the received service list based on the execution result of the execution unit 32 and the knowledge of the system. This amending process works in the case when a service list is changed by the execution result of the execution unit 32.

When the determination unit 37 determines that a message is returned to the present agent, the removal unit 38 removes from the service list the process information (possibly including the subsequent process information to be executed by the third agent 1c) to be executed when it is returned. When the message is returned, the return unit 39 returns the process information removed by the removal unit 38 to the service list of the message. Thus, the contents of an internal process can be prevented from being disclosed to another third agent 1c.

The collection unit 40 collects the message process state of the third agent 1c in the present agent. Since a service list showing the behavior of the collected message is added to the message, the state of the third agent 1c in the present agent can be correctly grasped.

As described above, according to the present invention, a service list defined by a combination of the message destination information and the message-specified process information is added to the message communicated between software products of agents, etc. distributed through a network. A message provided with its service list is transmitted to a plurality of software products with the service list which has been processed by a destination software product deleted. With this configuration, an efficiently distributed environment can be established without a load concentrated on a specific software product.

The present invention is described below in detail by referring to an embodiment applicable to a virtual catalog system.

FIG. 5 shows the configuration of the system of the virtual catalog system according to the present invention.

The virtual catalog system shown in FIG. 5 comprises a network 900 to which a product/service database 100, a database agent 200, a browser 300, a user agent 400, an intermediary agent 500, a first translation agent 600, a second translation agent 700, and an integral agent 800 are connected.

The communications among the database agent 200, the user agent 400, the intermediary agent 500, the first translation agent 600, the second translation agent 700, and the integral agent 800 can be established through the communications using an ACL (agent communications language).

The ACL is an inter-agent communications language in which messages communicated between agents are regulated, and comprises a knowledge representation language KIF (knowledge interchange format) for representing the knowledge such as the contents of information; a knowledge query and manipulation language KQML for regulating the verbal portion, referred to as a performative, of a transaction in an inter-agent communications; and an ontology indicating the type of word system used in an agent.

When an agent tries to establish communications using the ACL, it is necessary to abstract the actual information as the knowledge (virtual knowledge base VKB) of an agent. According to the embodiment shown in FIG. 5, the information to be processed is the product/service database 100. Therefore, the information in the product/service database 100 is abstracted into the VKB of the database agent 200.

The VKB can be accessed by retrieving a part of the knowledge described by the VKB, and specifying an operation (fetching, deleting, rewriting, etc.) to be performed on the retrieved knowledge. When the VKB is accessed in the ACL, the knowledge in the VKB to be processed in relation to the KIF is retrieved, and a corresponding operation is specified by the performative of the KQML.

The relation of the KIF can be the relation between a specific field of a record of the VKB and its value, the arithmetic relation between numeric values, the relation defining a logical combination of relations, the relation for obtaining a secondary result by applying acceptable conditions, etc.

The database agent 200 advertises its own ability to the intermediary agent 500 to realize the virtual catalog system.

The advertising information can be the name of the VKB, a category to be processed using the VKB, a field in the VKB, the ontology used in the VKB, the relation applicable in accessing the VKB, etc. Described below is an example of advertising information.

((database 'Momochihama Market')
(=>(member ?x 'Momochihama Market')
(isa ?x agricultural products)
(field-definition 'Momochihama Market', Product name 'is-text)
(field-definition 'Momochihama Market', Category name 'is-text)
(field-definition 'Momochihama Market', Category code 'is-number)
(field-definition 'Momochihama Market', Producer name 'is-text)
. . .
(default-ontology standard.database.kif)
(allows-relational-db-query 'Momochihama Market')))

According to the advertising information, the name of the VKB is 'Momochihama Market', and the related category is an agricultural product. Fields can be a product name, a category name, a category code, producer name, etc. A standard ontology is used, and an inquiry method followed as if it were based on a relational database determined among agents is applicable.

As shown in FIG. 3, according to the present invention, a service list is added to a message. The service list is defined by the combination of the destination information about a message and the process information specified by the message.

Figure 6:
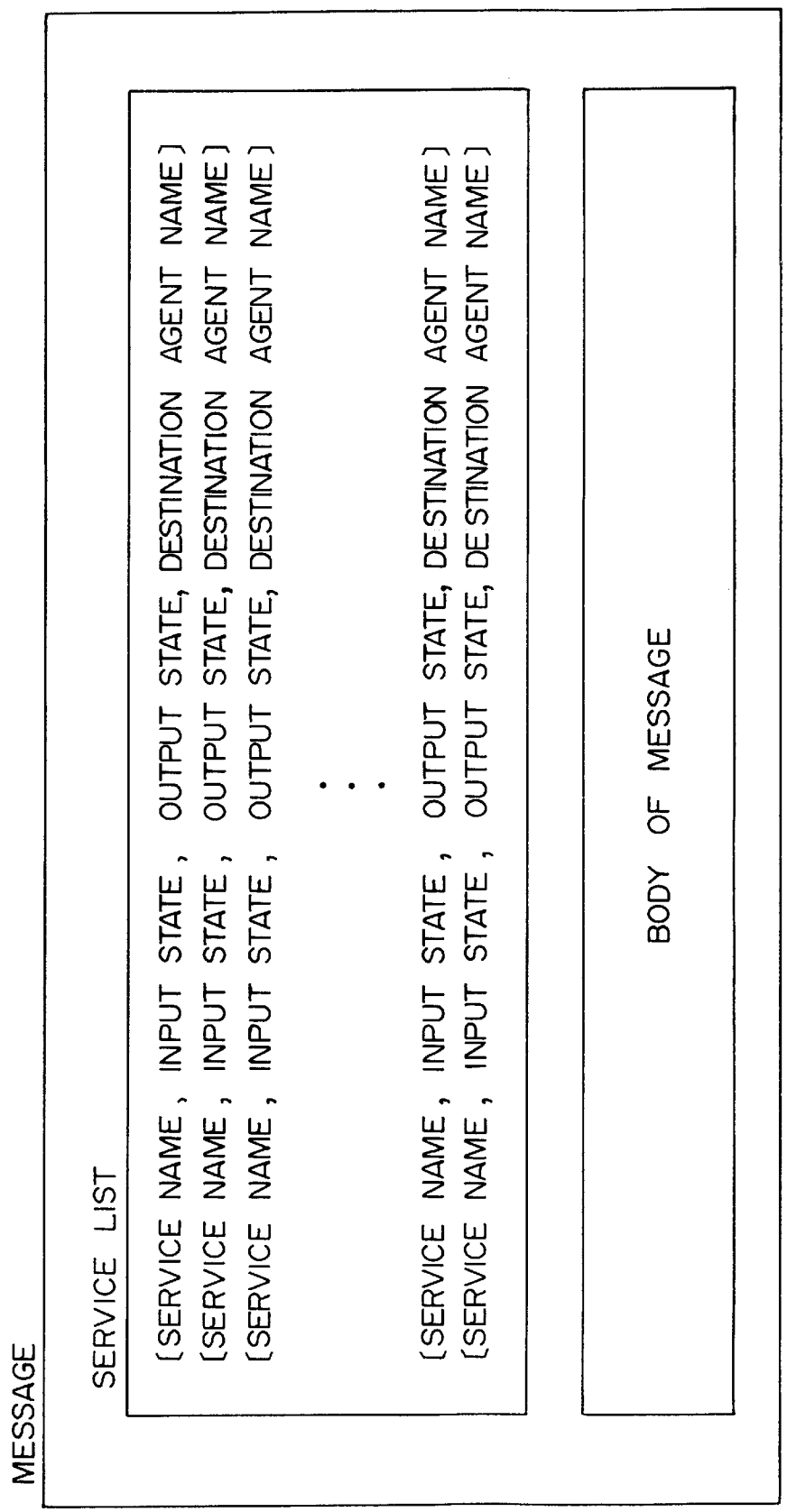
FIG. 6 shows a service list.

FIG. 6 shows an embodiment of a service list used when the present invention is applied to the virtual catalog system shown in FIG. 5.

The service list according to the present embodiment contains the name of a service to be executed by a destination agent, the state of a message before the process referred to by the service name (input ontology, etc.), the state of a message after the process referred to by the service name (output ontology, etc.), and the name of the destination agent. They are used in combination as one service list unit, and the service list units form a list.

Figure 7A:
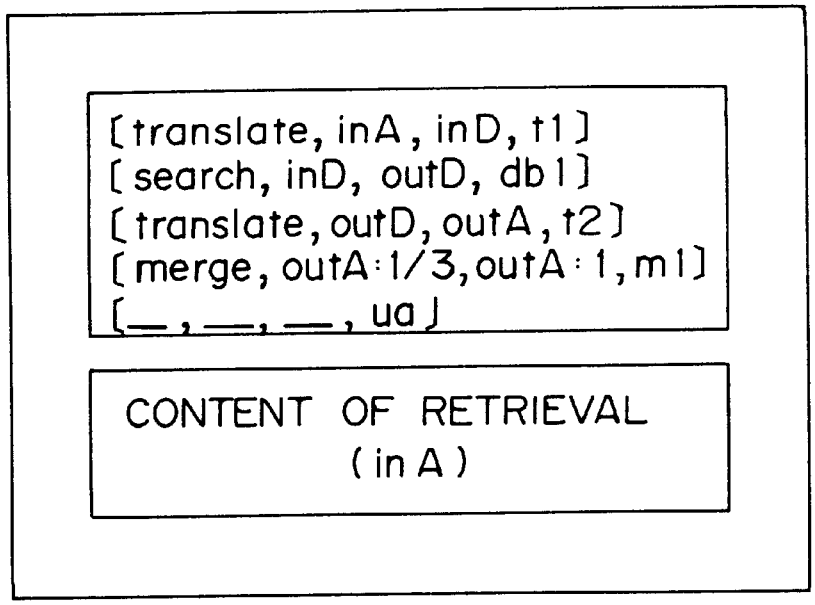
FIGS. 7A and 7B show a message.

This service list shows the contents and the procedure of a process. For example, in the service list shown in FIG. 7A, the first translation agent 600 (t1) first translates the retrieval contents specified by a message from an A ontology of a user agent to a D ontology of the database agent 200. Then, the database agent 200 (db1) retrieves the contents and obtains a retrieval result, and the second translation agent 700 (t2) translates the retrieval result from the D ontology to the A ontology. Then, the integral agent 800 integrates the retrieval results obtained by the three database agents 200, and gives the integration result to the user agent 400(ua).

Figure 7B:
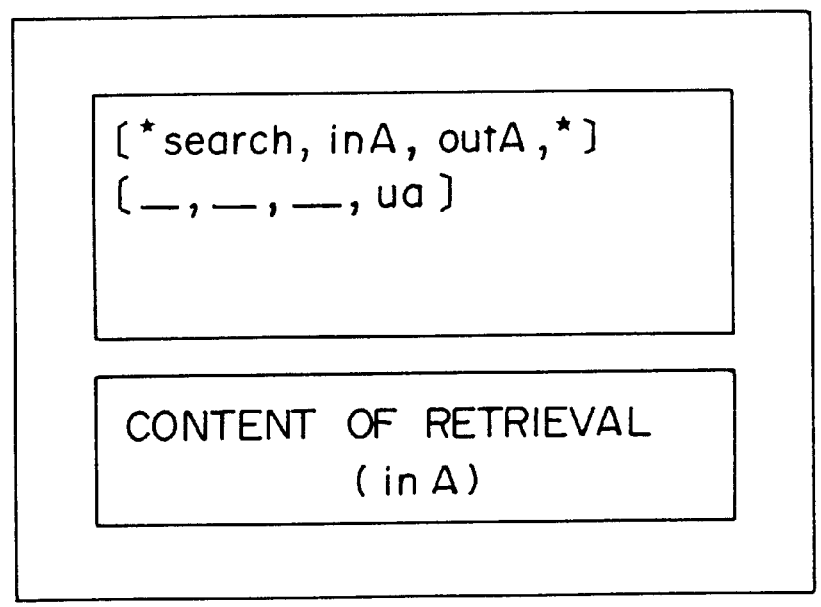

If a service list is at the abstract level because a service name, an input state, an output state, or a destination agent name to be stored in the service list cannot be determined, then the symbol * is added to output this information as shown in FIG. 7B.

Furthermore, the service name of the service list declares the relationship between the input state of the service list and the output state of the service list. The relationship refers to the following one or more restrictions. The restrictions can be the process in an agent: the process to be performed on a message; the resetting and embodying a service list including a message distribution route and a service name; and the transmission of a message to the next agent. Under the restrictions, each agent performs a process depending on the specification and implementation of each agent.

Every event can be specified by a service name as a target to be processed. According to the embodiment described below, the event is limited to the retrieval of a database, the translation of a message for application at a destination, the setting of a distribution route to an agent, and the merge of a plurality of messages.

The principal functions of the user agent 400 are to convert a retrieval request input through a browser into an ACL message, generate a service list at an abstract level in response to the retrieval request, add the service list at the abstract level to the ACL message, and transmit it to the intermediary agent 500.

Described below are the principal functions of the intermediary agent 500. That is, when the ACL message having the service list at the abstract level is transmitted from the user agent 400, the intermediary agent 500 refers to the above described advertising information transmitted from the database agent 200 to detail and embody the service list, added to the ACL message, at the abstract level, replaces the service list of the transmitted ACL message with the service list at the detail level, and then transmits the message to the database agent 200.

Described below are the principal functions of the database agent 200. That is, when the ACL message having the service list at the detail level is transmitted from the intermediary agent 500, the database agent 200 converts the retrieval contents specified by the ACL message into an SQL (structured query language) command and performs a retrieving process in response to the service list, added to the ACL message, at the detail level. At this time, the database agent 200 transmits an ACL message requesting translation to the first translation agent 600 and the second translation agent 700.

The principal function of the first translation agent 600 and the second translation agent 700 is to allow a plurality of database agents 200 having different word systems to be accessed by the user agent 400 by combining the word system of the user agent 400 with the word system of the database agent 200.

It is assumed that the first translation agent 600 performs the translating process from the A ontology to the D ontology, and that the second translation agent 700 performs the translating process from the D ontology to the A ontology.

Figure 8:
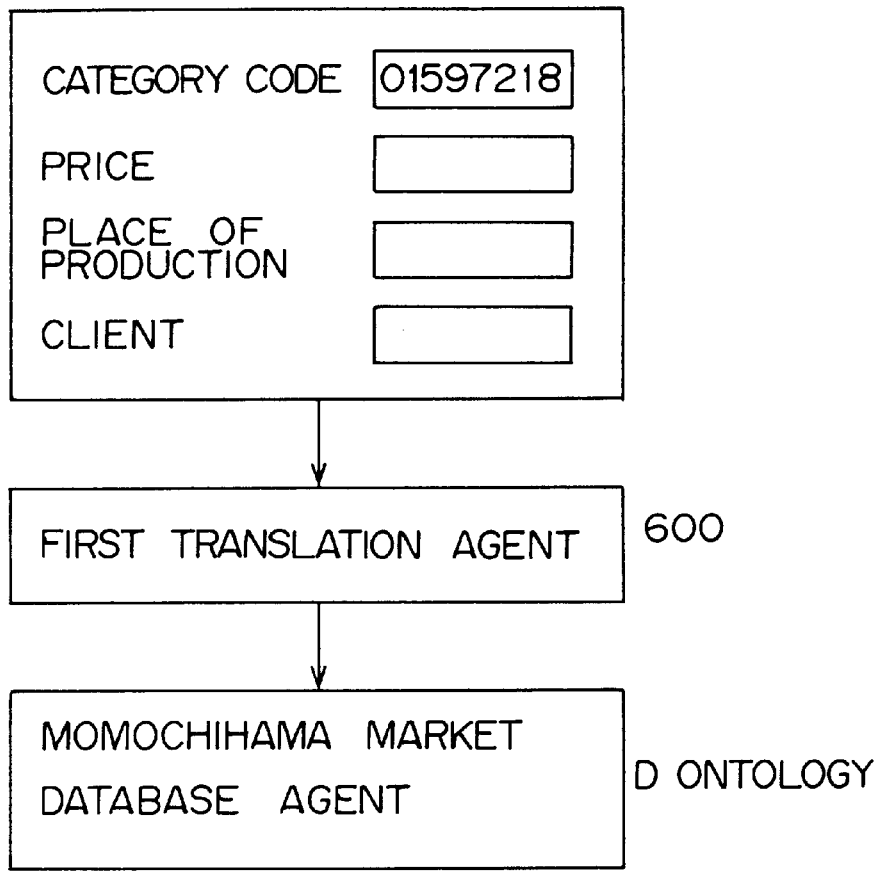
FIG. 8 shows the conversion of a word.

When the D ontology is used in the 'Momochihama Market' database as shown in FIG. 8 and the user issues a retrieval request on the retrieval screen of the A ontology system, the first translation agent 600 converts the item name 'place of production' used on the retrieval screen in the A ontology into the 'production place' used in the D ontology using the translation function used for the translation from the A ontology to the D ontology, and also converts the category code '01597218' input on the retrieval screen in the A ontology system into '30168945' used in the D ontology.

Figure 9:
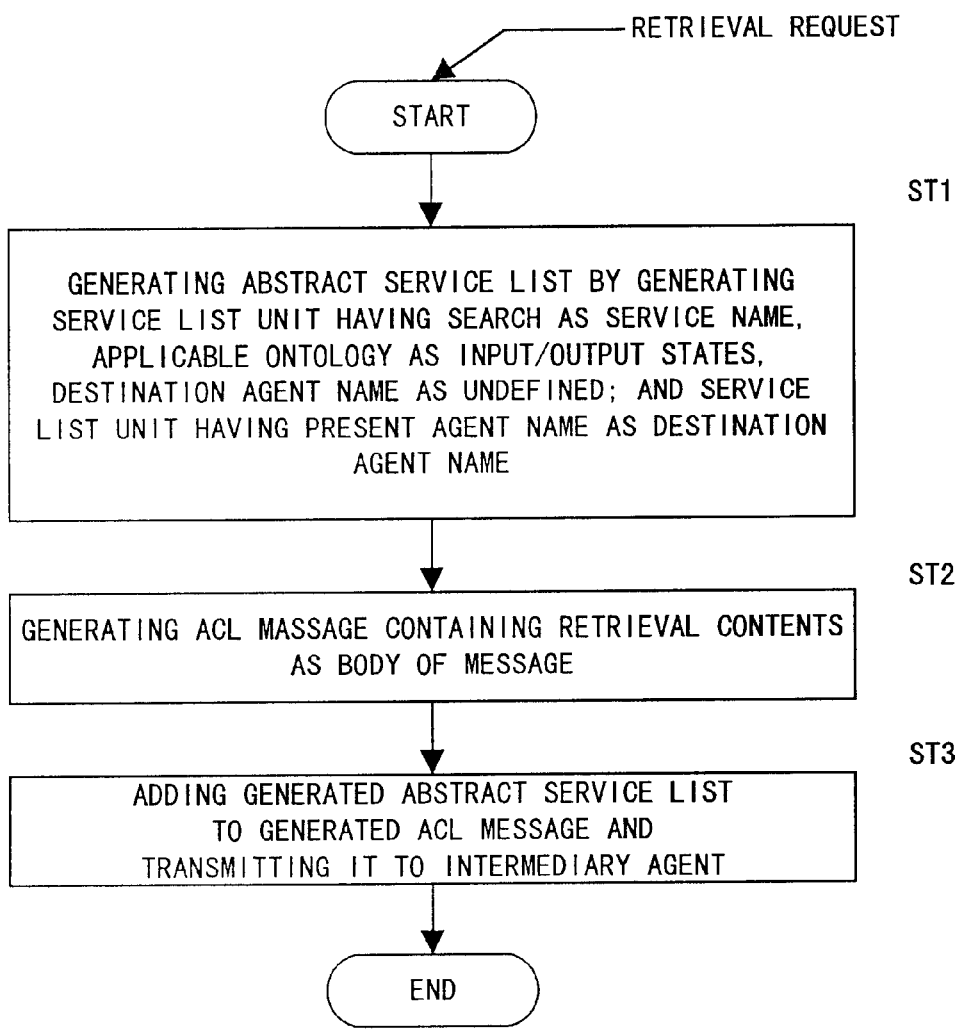
FIG. 9 is the flow of a process performed by a user agent.
Figure 12:
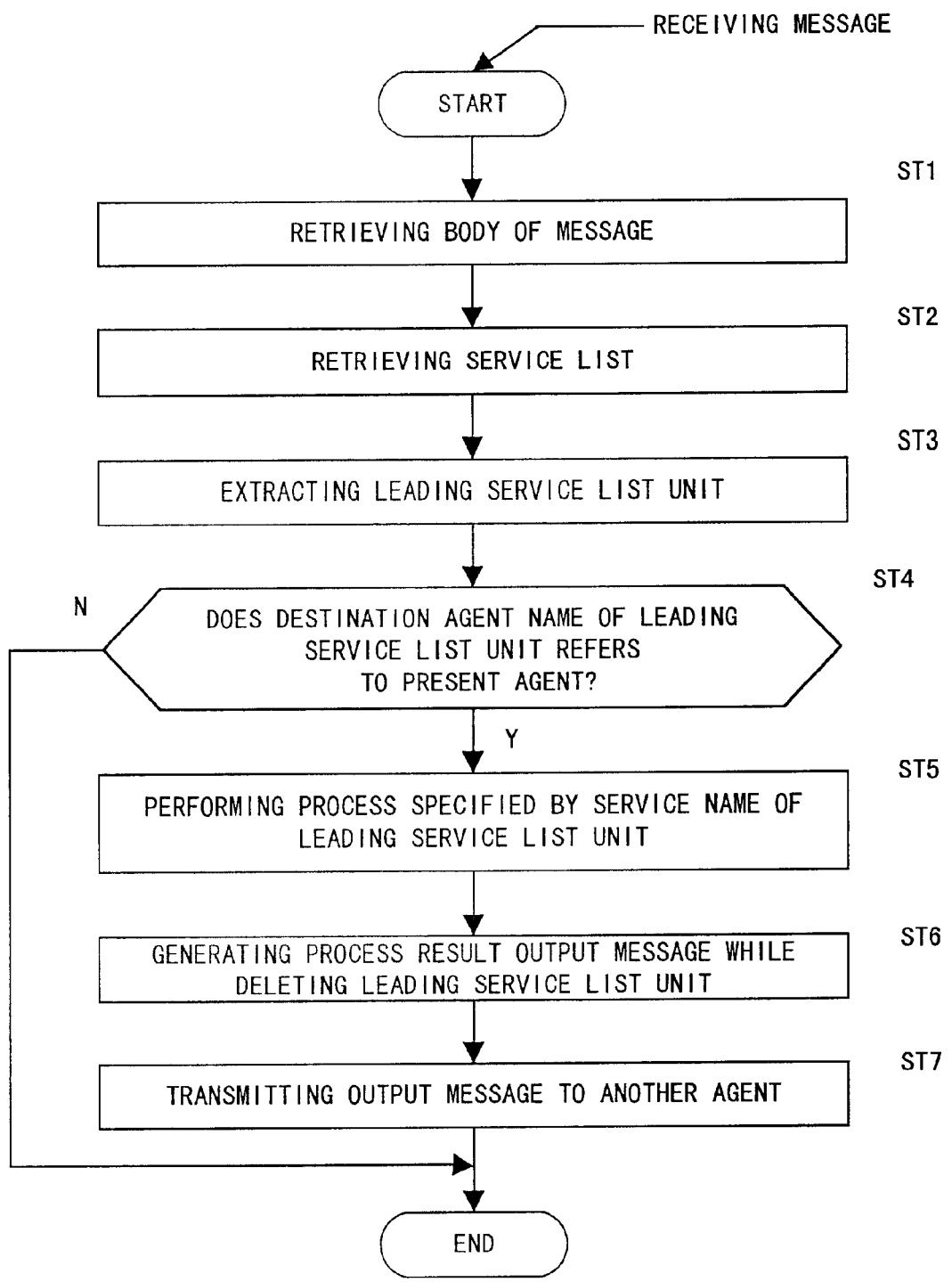
FIG. 12 is the flow of a process performed by an agent.
Figure 14:
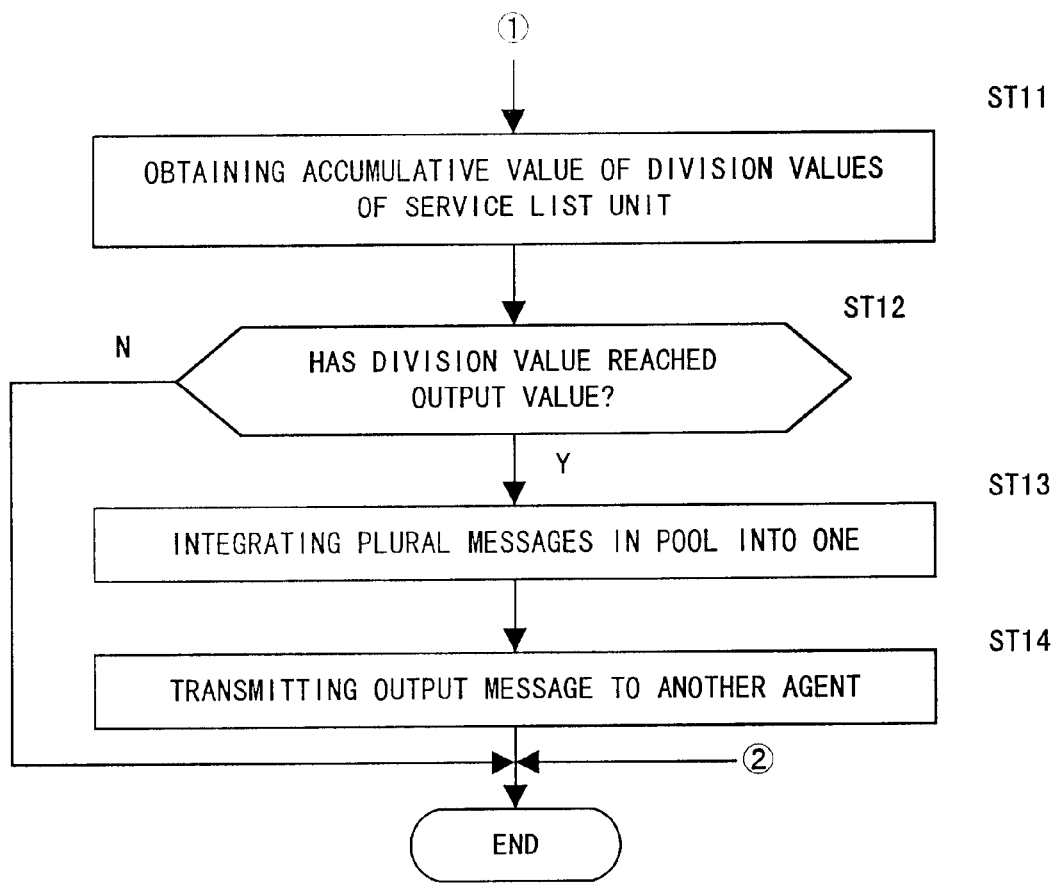
FIG. 14 is the flow of a process performed by an integral agent.
Figure 15:
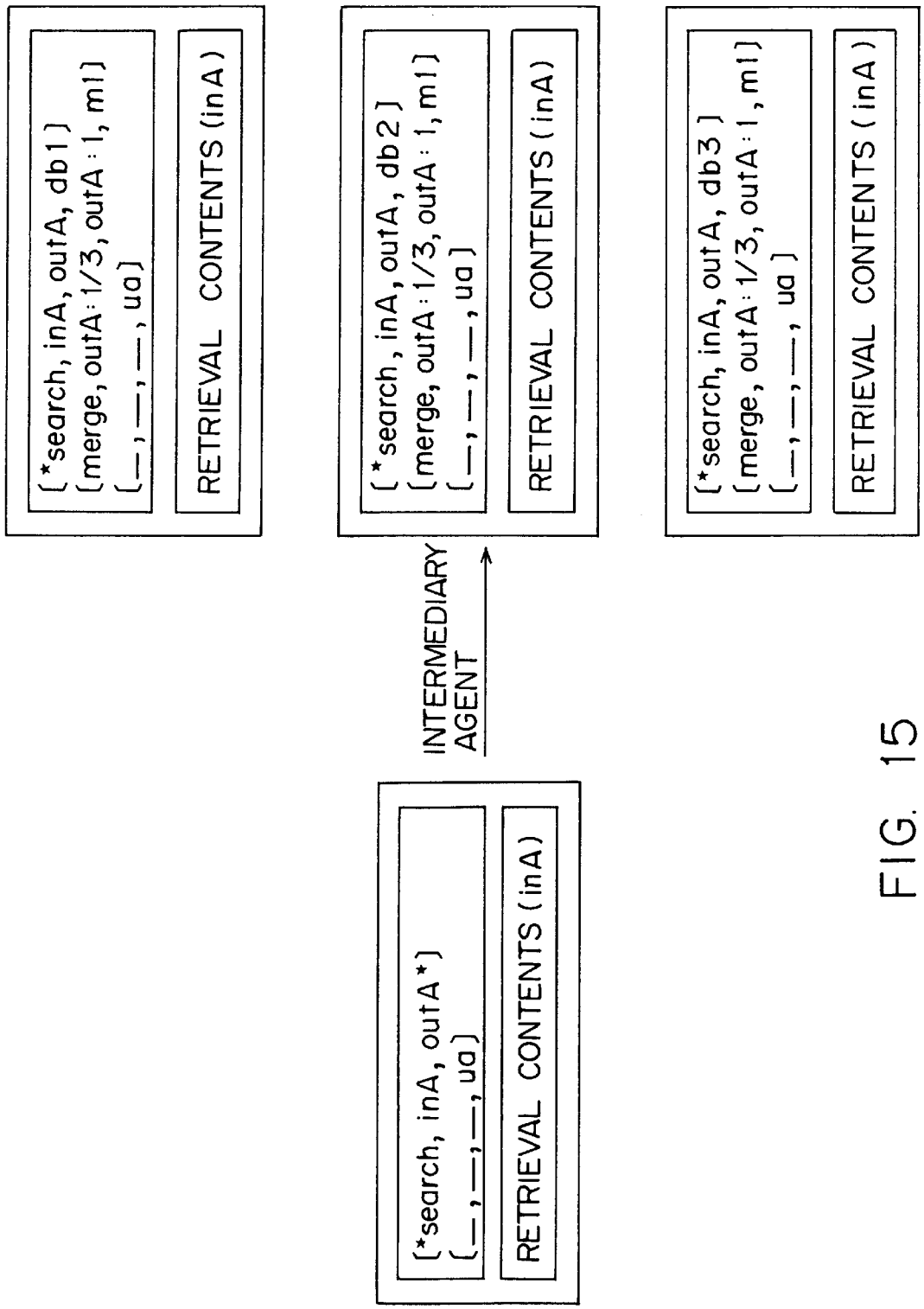
FIG. 15 shows an embodiment of a message.

FIG. 9 shows an embodiment of the process performed by the user agent 400. FIGS. 10 and 11 show embodiments of the processes performed by the intermediary agent 500. FIG. 12 shows an embodiment of the process performed by the database agent 200, the first translation agent 600, and the second translation agent 700. FIGS. 14 and 15 show embodiments of the processes performed by the integral agent 800.

The details of the present invention are described below by referring to the above described processes.

Upon receipt of a retrieval request from the user to the product/service database 100, the user agent 400 first generates an abstract service list by defining 'search' as a service name, setting an applicable ontology in the input/output state, and generating service list units with the name of a destination agent undefined and with the name of the present agent defined as the name of a destination agent in step 1 as shown in the process flow in FIG. 9.

That is, if the ontology used by the user agent 400 is the A ontology, then the following abstract service list can be generated.

[* search, inA, outA, *]

[__, __, __, ua]

Then, in step 2, an ACL message is generated containing the retrieval contents as the body of the message. For example, assuming that a request to retrieve, from the product/service database 100 belonging to the category of agricultural products, the producers in Aomori of apples sold at or cheaper than 1500 yen/10 kg is issued, an ACL message containing such retrieval contents as the body of the message is generated.

Then, in step 3, the generated abstract service list is added to the generated ACL message, and then transmitted to the intermediary agent 500, thereby terminating the process.

Upon receipt of the ACL message of a retrieval request issued by the user agent 400, the intermediary agent 500 first retrieves the category specified by a retrieval request from the retrieval contents of the received ACL message in step 1 as shown in the process flow in FIGS. 10 and 11. That is, if the retrieval contents refer to agricultural products as a category, then the specification of agricultural products as a category is retrieved.

Then, in step 2, the database agent 200 for processing the retrieved category is selected by referring to the advertising information from the database agent 200. As described above, since the database agent 200 preliminarily advertises to the intermediary agent 500 the ability information about the category, etc. applicable in the database agent 200, the database agent 200 which processes the category specified by the retrieval contents is selected according to the advertising information.

Then, it is determined in step 3 whether or not there is more than one elected database agent 200. If yes, control is passed to step 4, and the service name 'merge' is added between the two service list units of the service list received from the user agent 400. The input ontology applicable in the integral agent 800 for executing the merge, and the '1/n' where n indicates the number of the selected database agents 200 are entered as an input state. The output ontology applicable in the integral agent 800 for executing the merge, and '1' obtained from 'n×(1/n)=1' are entered as an output state. The agent name of the integral agent 800 for executing the merge is entered as the destination agent name.

That is, assuming that the ontology applicable in the integral agent 800 is the A ontology, the number of the selected database agents 200 is 3, and the agent name of the integral agent 800 is m1, the following service list unit is inserted between the two service list units of the service list received from the user agent 400.

[merge, outA:⅓, out:1, m1]

Then, in step 5, a message is copied for the number of database agents 200. That is, if the number of the selected database agents 200 is n, then n copies of the message are made. The copies made in this copying process have identical IDs.

When the copying process is completed in step 5, and it is determined in step 3 that the number of selected database agent 200 is 1, control is passed to step 6 and the agent name of the selected database agent 200 is entered as the destination agent name of the leading service list unit in the service list.

That is, if the agent names of the selected database agents 200 are db1, db2, and db3, they are entered as the destination agent names (undefined in the abstract service list transmitted from the user agent 400) of the leading service list unit of the three messages generated through steps 4 and 5 as follows.

[* search, inA, outA, db1]
[* search, inA, outA, db2]
[* search, inA, outA, db3]

In step 7, one of the selected database agents 200 is selected. Then, it is determined in step 8 whether or not all database agents have been retrieved. If yes, control is passed to step 9 (process flow shown in FIG. 11), and the service list detailed in the above described processes is added to the message and transmitted to the database agent 200, thereby terminating the process.

If it is determined in step 8 that all information about the database agent 200 has not been retrieved, then control is passed to step 10 (process flow in FIG. 11) and the ontology applicable in the retrieved database agent 200 is checked by referring to the advertising information from the stored database agent 200. In step 11, the ontology is entered as the input and output states of the service list unit of 'search'.

That is, if the ontology applicable in the selected database agent 200 is the D ontology, for example, the D ontology is entered as the input and output states in [* search, inA, outA, db1] to detail the service list unit of 'search' as follows.

[search, inD, outD, db1]

Then, it is checked in step 12 whether or not the ontology applicable in the retrieved database agent 200 is different from the ontology (recorded on the abstract service list transmitted from the user agent 400) used in the retrieval requester user agent 400.

In this checking process, if it is determined that the ontology used in the database agent 200 matches the ontology used in the user agent 400, then control is immediately returned to step 7.

If it is determined that the above described ontologies don't match each other, then control is passed to step 13, the service name 'translate' is added before and after the service list unit of 'search' in the service list, the translated-from ontology is entered as an input state and the translated-to ontology is entered as an output state, the agent name of the first translation agent 600 or the second translation agent 700 for executing the 'translate' is entered as a destination agent name, and control is returned to step 7.

That is, if the ontology used in the selected database agent 200 is the D ontology, the ontology used in the retrieval requester user agent 400 is the A ontology, the agent name of the first translation agent 600 for performing the translating process from the A ontology to the D ontology is t1, and the agent name of the second translation agent 700 for performing the translating process from the D ontology to the A ontology is t2, then the service list unit [translate, inA, inD, t1] is inserted before the service list unit of 'search' in the service list to notify the database agent 200 of the retrieval contents, and the service list unit [translate, outD, outA, t2] is inserted after the service list of 'search' in the service list to notify the user agent 400 of the retrieval result.

Figure 16:
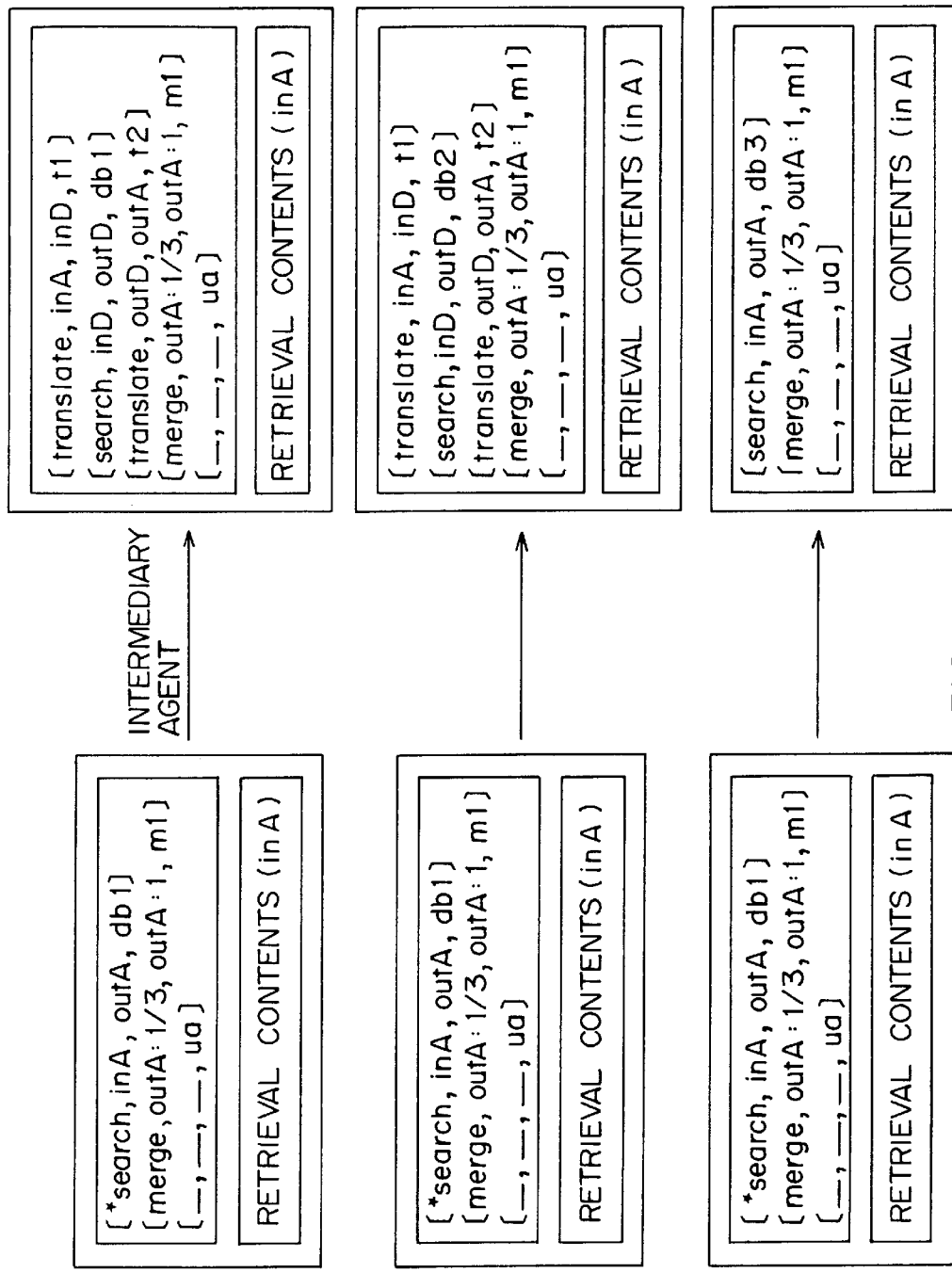
FIG. 16 shows an embodiment of a message.

Thus, when the intermediary agent 500 receives a retrieval request message having the service list at an abstract level from the user agent 400, the intermediary agent 500 details and embodies the service list at the abstract level as shown in FIGS. 15 and 16, and transmits the message having the detailed service list to the database agent 200.

In FIG. 16, one database agent 200 uses the same ontology as the user agent 400, and the translating process is not performed by the first translation agent 600 or the second translation agent 700.

Figure 17:
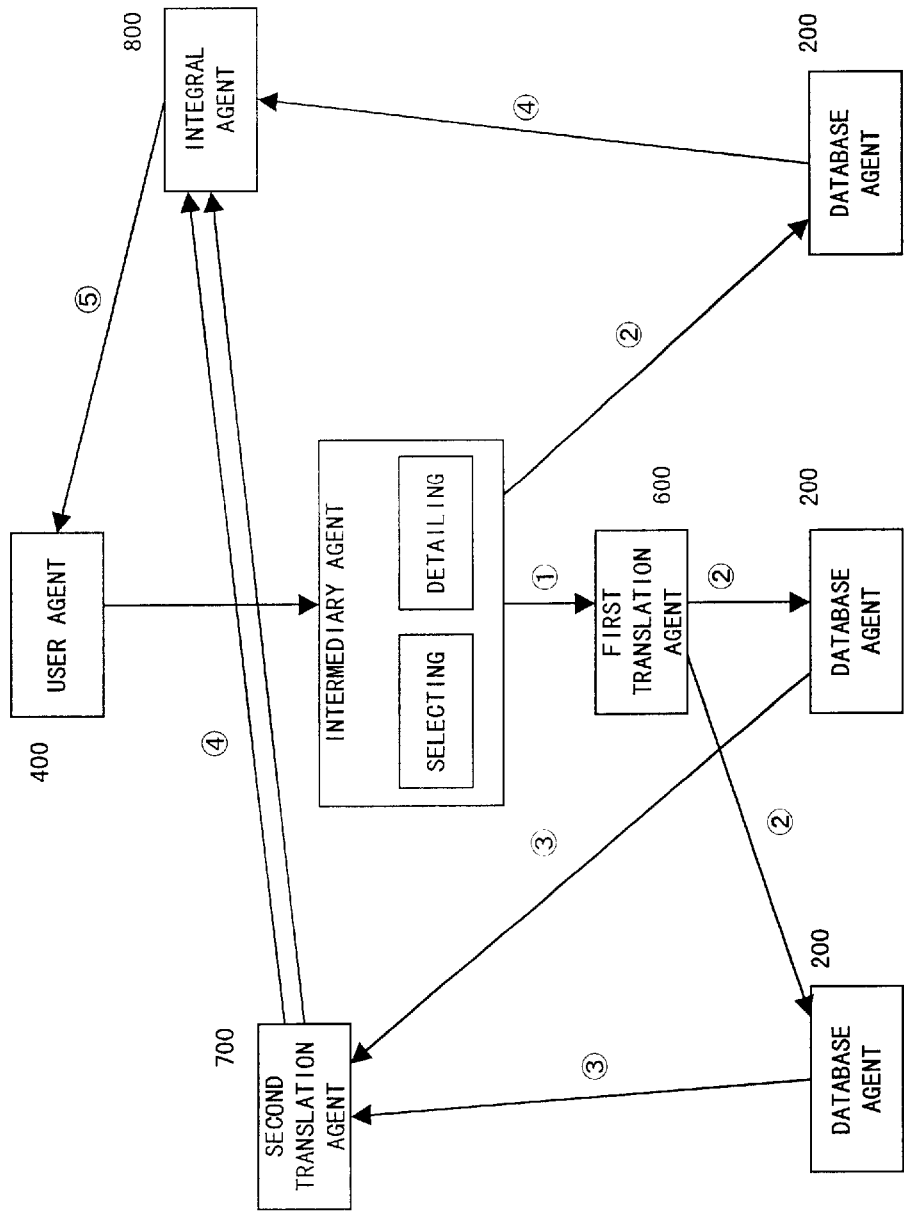
FIG. 17 shows a process of an embodiment of the present invention.

Message-specified retrieval contents of the service list at the detail level as shown in FIGS. 15 and 16 are first translated from the A ontology to the D ontology by the first translation agent 600 as shown in FIG. 17 as necessary. Then, the database agent 200 retrieves the retrieval contents to obtain the retrieval results. The second translation agent 700 translates the retrieval results from the D ontology to the A ontology as necessary. Then, the integral agent 800 integrates the retrieval results retrieved by the database agent 200, and answers the integration result to the user agent 400.

Described below is the processes performed by the database agent 200, the first translation agent 600, the second translation agent 700, and integral agent 800.

These agents basically perform the processes according to the process flowcharts in FIG. 12. For convenience, the process performed by the integral agent 800 is described by referring to the detailed flowcharts in FIGS. 13 and 14.

When the database agent 200, the first translation agent 600, and the second translation agent 700 receive a message having a service list at a detail level, they first retrieve the body of the message from the received message in step 1 as shown in the process flowchart in FIG. 12. In this embodiment, the body of the message refers to retrieval contents or retrieval results.

Then, in step 2, a service list of the received message is retrieved. The service list contains, as described above, the name of the service to be executed by the destination agent, the input state of the message, the output state of the message, and the destination agent name as a service list unit. A plurality of service list units are arranged as a listing.

In step 3, the leading service list unit is extracted from the service list. In step 4, it is determined whether or not the destination agent name in the leading service list unit refers to the present agent. If it is determined the name does not refer to the present agent, then the process to be performed by the present agent is not specified, thereby terminating the current process.

If it is determined that the present agent is specified, control is passed to step 5 and a necessary change is made to the body of the message by performing the process specified by the service name in the leading service list unit by referring to the input and output states specified as necessary.

For example, the first translation agent 600 translates the word system of the retrieval contents in the body of the message from the A ontology to the D ontology according to the specification of the service name of 'translate'. On the other hand, the database agent 200 retrieves the product/service database 100 based on the retrieval contents in the body of the message according to the specification of the service name of 'search'. The second translation agent 700 translates the word system of the retrieval contents in the body of the message from the D ontology to the A ontology according to the specification of the service name of 'translate'.

Then, after the above described process has been completed, the process result output message is generated while the service list is added with the leading service list unit deleted in step 6. In step 7, the generated output message is transmitted to another agent, thereby terminating the process.

When the intermediary agent 500 generates the following service list at the detail level shown in FIGS. 15 and 16 according to the process flowchart in FIG. 12;

[translate, inA, inD, t1]
[search, inD, outD, db1]
[translate, outD, outA, t2]
[merge, outA:⅓, out:1, m1]
[_, _, _, ua]

first, the first translation agent 600 is activated, and the retrieval contents in the body of the message is translated from the A ontology to the D ontology as shown in FIG. 18A. Then, the database agent 200 is activated, and the retrieval result is obtained as represented in the D ontology as shown in FIG. 18B. Then, the second translation agent 700 is activated, and the retrieval result obtained by the database agent 200 is translated from the D ontology to the A ontology as shown in FIG. 19.

Figure 19:
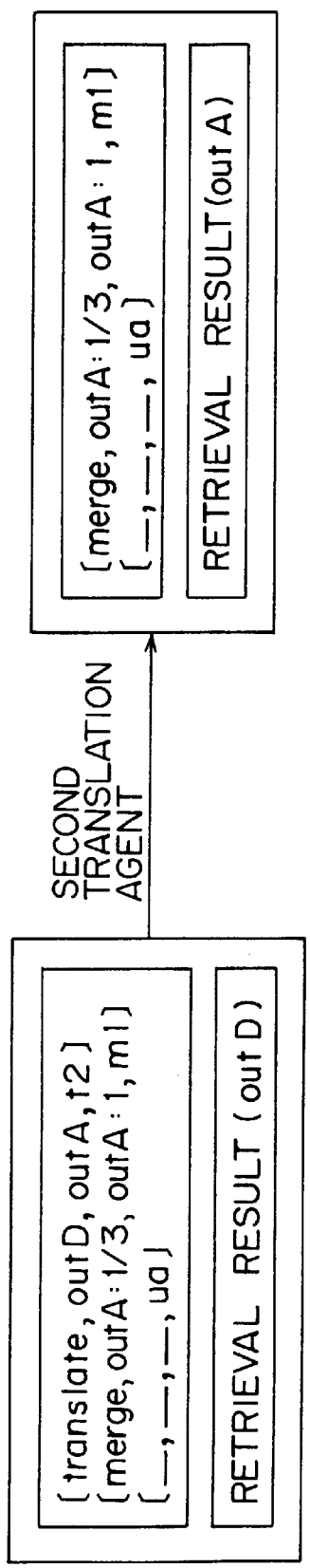
FIG. 19 shows an embodiment of a message.

The service list at the end of the process is described as shown in FIG. 19 as follows.

[merge, outA:⅓, out:1, m1]
[_, _, _, ua]

The integral agent 800 is activated in response to 'merge' of the service name in the service list.

The process performed by the integral agent 800 is described below by referring to the process flowchart in FIGS. 13 and 14.

Upon receipt of a message having a service list at a detail level, the integral agent 800 first retrieves the body of the message in the received message in step 1 as shown in FIGS. 13 and 14. The message transmitted to the integral agent 800 is obtained as a retrieval result by the database agent 200. Therefore, in step 1, the retrieval result can be obtained when the message is addressed to the present agent.

Then, in step 2, the service list in the received message is retrieved. In step 3, the leading service list unit is extracted from the service list. In step 4, it is determined whether or not the destination agent name in the leading service list unit refers to the present agent. If it is determined that the name does not refer to the present agent, then the process of the present agent is not specified, thereby terminating the process.

If it is determined that the name refers to the present agent, then control is passed to step 5 and the ID of the received message is retrieved, and it is determined in step 6 whether or not the pool of the same message IDs exists.

If it is determined in step 6 that no pool of the same message IDs exists, then control is passed to step 7 to generate a pool corresponding to a message ID, and an output value of 1 in the service list unit (obtained from 'n×(1/n)=1' entered as the output state in step 4 of the process flowchart in FIG. 10) is set as an output value of a pool in step 8. Then, in step 10, the body (retrieval result) of the message retrieved in step 1 is stored in the generated pool.

If it is determined in step 6 that a pool of the same message IDs exists, then control is passed to step 9 to access the pool generated corresponding to a message ID, and the body of the message (retrieval result) retrieved in step 1 is stored in the accessed pool in step 10.

When the storing process is completed in step 10, an accumulative value of a division value (1/n entered as an input state in step 4 of the process flowchart in FIG. 10) of the service list extracted in step 3 is obtained in step 11 (process flowchart shown in FIG. 14). Then, it is determined in step 12 whether or not the accumulative value has reached the output value of 1 as set in step 8.

If it is determined that the accumulative value of the division value of the leading service list unit in the received message has not reached the output value of 1, the process terminates. If it is determined that the value has reached the output value of 1, that is, it is determined that all messages copied according to the process flowchart in FIG. 10 have been stored, then the bodies of a plurality of messages (retrieval results) stored in a pool are integrated into one message in step 13. In step 14, the output message of the integration result is transmitted to another agent, and the process terminates.

Figure 20:
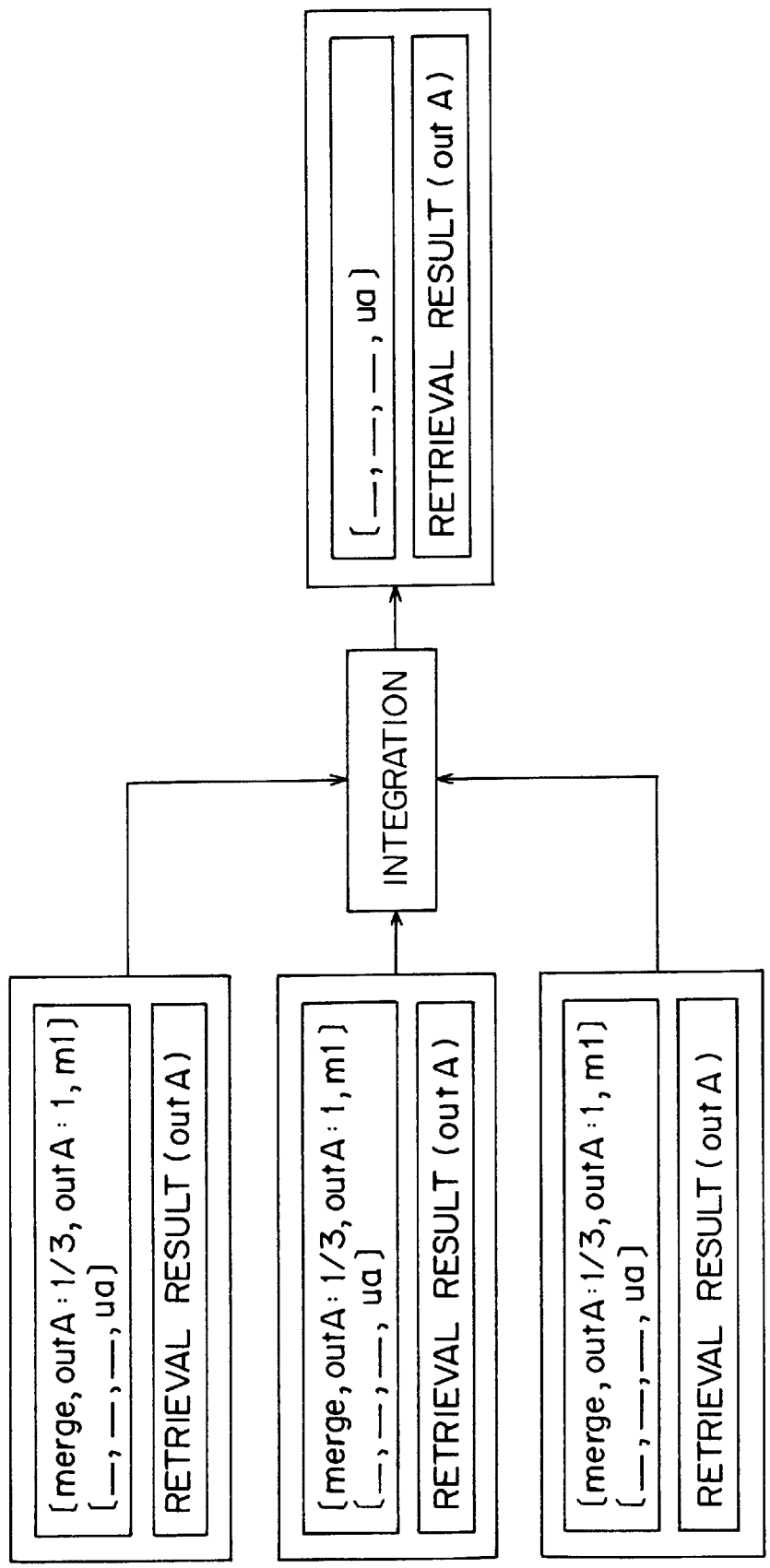
FIG. 20 shows an embodiment of a message.

Thus, when there are more than one database agent 200 for processing the category of the retrieval request, the integral agent 800 performs the process such that the retrieval results obtained from the database agent 200 can be merged as shown in FIG. 20.

A service list [_, _, _, ua] is added to the above described transmitted output message of the integration result. Upon receipt of the service list, the retrieval requester user agent 200 obtains the retrieval result integrated by the integral agent 800.

Thus, when a request to retrieve producers in Aomori of apples equal to or cheaper than 1,500 yen/10 kg is issued, and when a producer 'Tsugaru Farm' and a producer 'Hirosaki Farm' are retrieved from different database agents 200, the retrieval results of the two producers are merged and transmitted as an answer to the user agent 400. Thus, the user can obtain the retrieval result as if it were obtained from one product/service database 100.

As indicated by this embodiment, a service list added to a message indicates a process flow whose state changes while it is transmitted through a plurality of agents.

If each agent is designed to store a message received from another agent, a fault can be easily and correctly detected when it occurs. Each agent can easily and correctly grasp the state of a process by referring to the state of the process of a message of its subordinate agent.

FIG. 21 shows another example of the flowchart of the process performed by the database agent 200, the first translation agent 600, the second translation agent 700, and the integral agent 800.

The difference between this process flow and the process flow in FIG. 12 is that the process in FIG. 12 is designed to perform only the process specified by the leading service list unit in the service list in a received message while the process shown in FIG. 21 is designed such that the present agent can, if possible, perform a process specified by the subsequent service list units, and then an executed service list unit is deleted from the service list in step 8.

Figure 22:
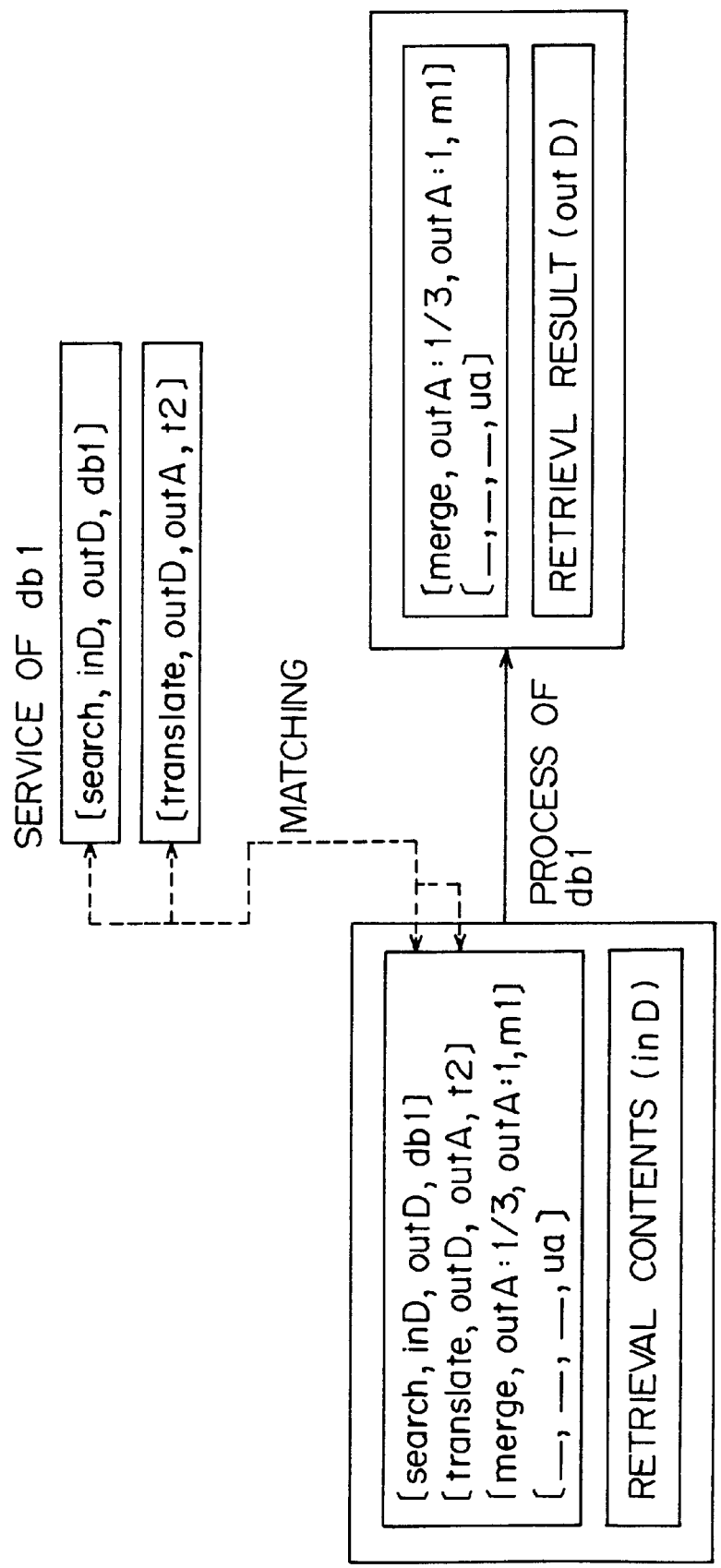
FIG. 22 shows an embodiment of a message.

For example, when the database agent 200 receives a message having the following service list, the database agent 200 (db1) performs a translating function on behalf of the second translation agent 700 (t2) when the database agent 200 has the translating function of the second translation agent 700 as shown in FIG. 22.

[search, inD, outD, db1]
[translate, outD, outA, t2]
[merge, outA:⅓, out:1, m1]
[_, _, _, ua]

Since the service lists should be sequentially processed, the present agent cannot be a substitute for performing a process if it is preceded by another process which cannot be performed by the present agent. However, if there are adjacent processes which can be performed by the present agent, the present agent can be a substitute for performing all of the processes.

For example, when an agent who details a service list does not completely grasp the ability of the process execution agent, or when a plurality of agents detail the same service list step by step, the function of performing the agent process can successfully optimize the process.

In the present embodiment, an agent is designed to sequentially perform processes that can be performed by the agent. If an agent has the function of collectively perform a group of processes that can be performed by the agent, a plurality of service list units are collectively retrieved from the head of the service list. The retrieved units are compared with the processes that can be performed by the agent. If there are a plurality of processes that can be collectively performed, it is desired that they are collectively processed.

Figure 23:
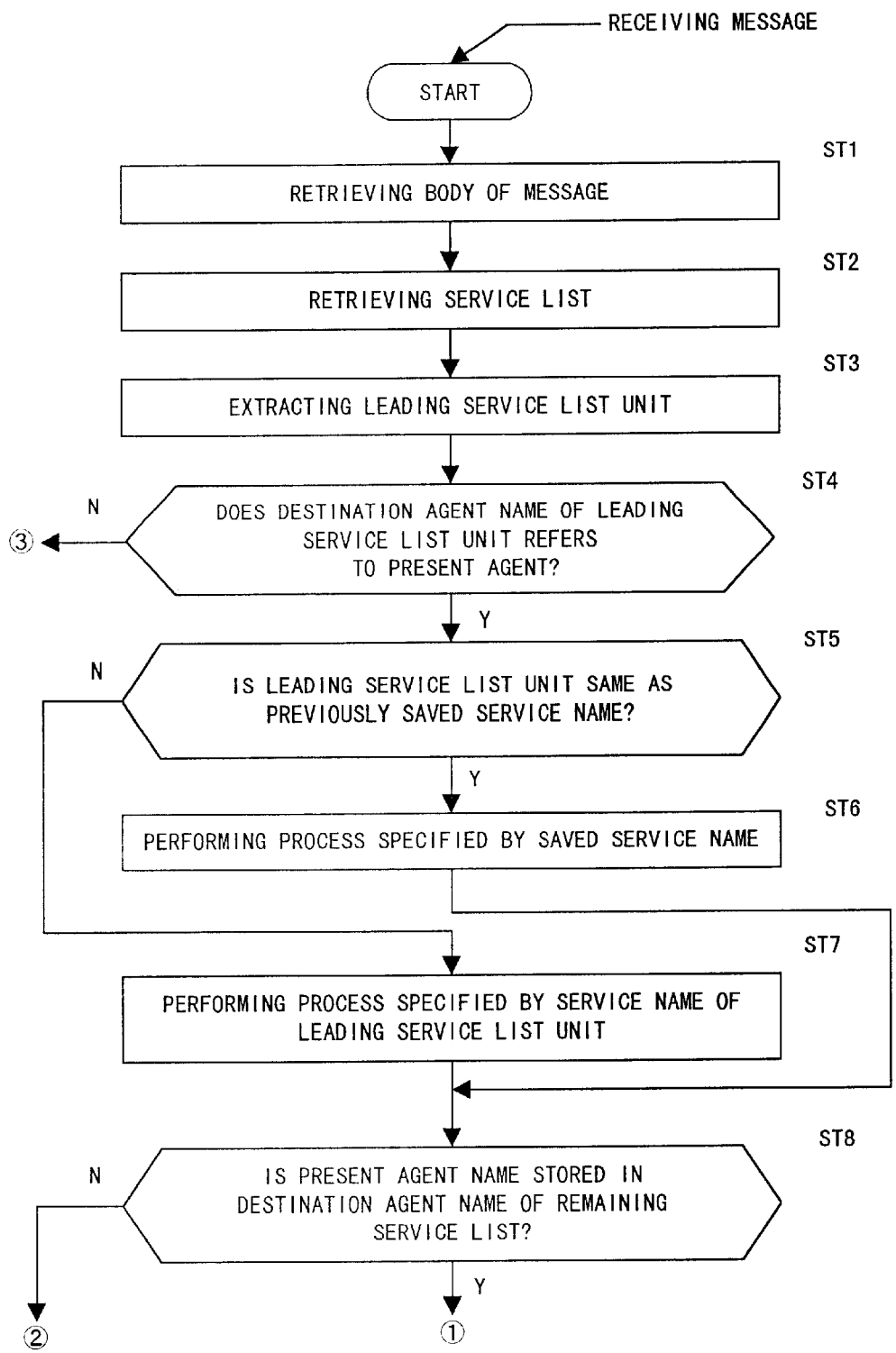
FIG. 23 is the flow of a process performed by an agent.
Figure 24:
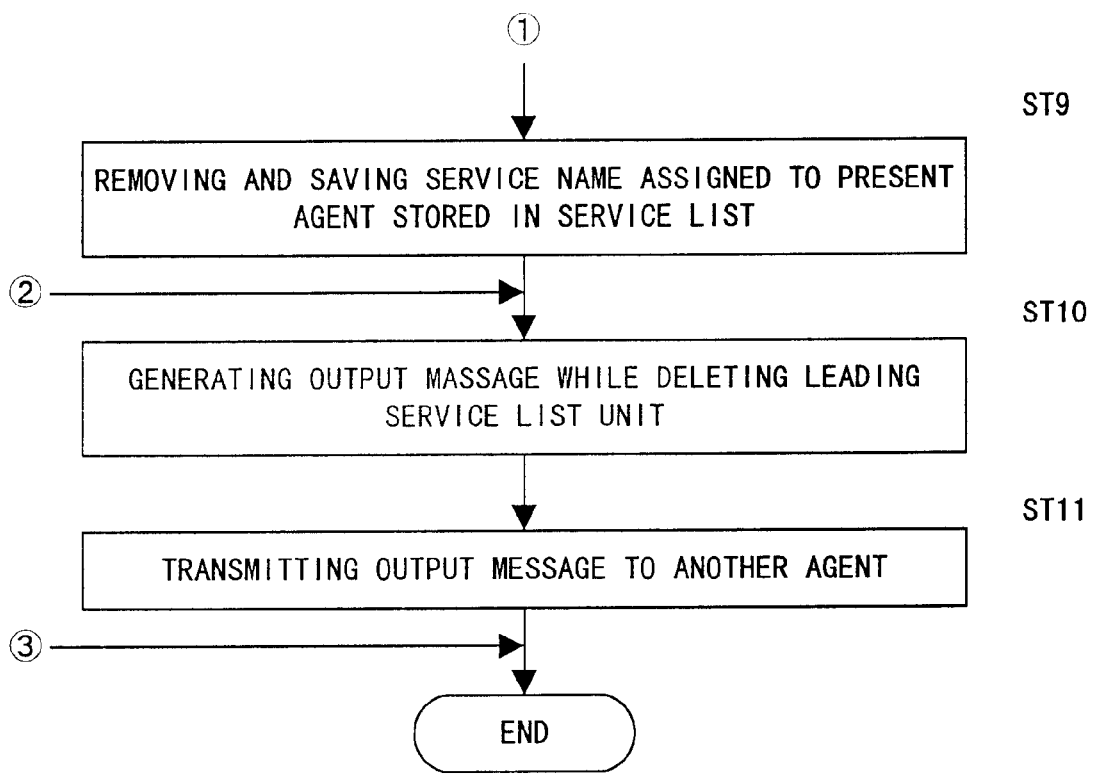
FIG. 24 is the flow of a process performed by an agent.

FIGS. 23 and 24 show another embodiment of the processes performed by the database agent 200, the first translation agent 600, the second translation agent 700, and the integral agent 800.

The difference between the process flow shown in FIGS. 23 and 24 and the process flow shown in FIG. 12 is that an output message of a process result is transmitted as is after performing the process of the leading service list unit according to the process flow shown in FIG. 12 while it is determined whether or not any of the service list units after the leading service list unit specifies the present agent, and the service name of the process is removed from the service list (input state and output state can also be removed) if the determination indicates yes, that is, it is determined that the message is to be returned to the agent according to the process flow shown in FIGS. 23 and 24. In this case, when the message is returned, it is processed by the agent.

That is, if a process specified by the leading service list unit in the service list of the received message addressed to the present agent is performed in step 7, then it is determined in step 8 whether or not the remaining service list contains the name of the present agent as a destination. If yes, the assigned service name is removed from the service list and saves it.

When the present agent receives a message assigned to itself, it determines in step 5 whether or not the service name of the leading service list unit is the same as the previously saved service name. If yes, the process of the removed service name is performed in step 6.

As described above, the present invention does not recognize a message as a simple transmission object, but as a part of a flow whose state changes while it is transmitted through various agents. Furthermore, the present invention is based on the message-oriented approaching technology in which a flow of a series of processes are defined with the state change of the message toward a destination agent taken into account.

In the approach according to the present invention, a process which has been performed conventionally by an intermediary agent is performed by another agent by explicitly indicating the procedure of various processes, and a procedure of processes which has been determined by an intermediary agent can be determined by another agent, thereby reducing the number of message transmitting operations.

However, since the processes performed on a message are all written to a service list, the contents of the message are revealed and may be abused. Furthermore, since all contents of the process are written to a service list, the size of the message may be extended. Additionally, in the above described agent process, another agent may be a substitute for performing the process to be performed by the present agent, thereby arising a security problem.

In the process flow shown in FIGS. 23 and 24, the process information (service name, input state, and output state) about a message whose process is written in a service list and processed when the message is returned to the present agent is hidden from other agents. When the message is returned to the present agent, the service list is restored.

The process information about a process performed by another agent after the process information about a process can also be hidden from other agents so that it can be restored when it is returned to the present agent.

The service list is restored practically by the following system. That is, an agent stores in a storage pool of a service list in the agent the process information about a process to be performed when it is returned to the agent before transmitting a message, and adds, instead of the stored process information, the parameter for referring to the stored process information to the service list to be transmitted. When the agent receives a message, the process information to be stored is restored in the service list when it is determined that a reference parameter is stored in the service list and the reference parameter refers to the process information stored in the present agent.

According to the process flow shown in FIGS. 23 and 24, the contents of the process of the present agent and the processes performed after the present agent can be hidden from other agents, and the contents of the service can be protected from being read by other agents, thereby improving the security of the information. In addition to the advantages that the process to be performed by the present agent can be prevented from being performed by another agent, and that the size of a message can be reduced, it is guaranteed that a message is returned to the original system space through an agent used when the message is transmitted into another system space (another knowledge space).

FIG. 25 shows another example of the flow of the process performed by the database agent 200, the first translation agent 600, the second translation agent 700, and the integral agent 800.

The difference between the process flow and the process flow shown in FIG. 12 is that the process of the leading service list unit is performed and the service list unit is deleted in the process flow shown in FIG. 12 while, according to the process flow shown in FIG. 25, the remaining service list is amended if it should be amended based on the process result.

That is, when a process specified by the leading service list unit of the service list in the received message addressed to the present agent in step 5, the service list is amended in step 8 if it is determined in step 6 that the service list should be amended according to the process result.

Assume that an agent system performs, for example, a travel agent process. Initially, if a service list is generated with no flight, air service company, etc. determined, and if an agent which makes a hotel reservation determines that a discount is allowed by a specific air service company in contract with the reserved hotel, then the name of the destination agent in the service list transmitted to the agent which makes a flight reservation is amended to the name of the air service company which allows the discount.

According to the process flow, a more practical agent system can be generated by dynamically and appropriately changing the initially generated service list.

Described below is how a service list is detailed.

According to the present invention, when a service list at an abstract level is generated, it is detailed according to the knowledge about the agent which performs the service obtained according to advertising information, etc.

The detailing operation on a service list can be performed by a single agent, but one or more subsequent agents can be trusted with a part of the detailing process. A subsequent agent more familiar with the service should detail a service list with efficiency, and a service list can be efficiently detailed when a message is processed.

FIG. 26 shows the configuration of the service list detailed step by step by a plurality of intermediary agents.

The first, second, and third intermediary agents do not have the knowledge about all agents for performing services, but have the knowledge about a part of the plurality of agents.

When the first intermediary agent receives a service list transmitted from a user agent, it details a service requested from a user agent into a more concrete service, for example, a service such as database retrieval after converting an ontology, etc. according to the information, which is stored in the first intermediary agent, about a service executable by other agents. Then, the first intermediary agent selects an translation agent and a database agent for performing the service. Then, it generates a service list specifying a service name and a selected agent, adds the service list to the message, and transmits the message to the next agent. Each of the intermediary agents stores the information about other intermediary agents, and transmits the message through other agents by defining the agent as a destination of the message.

Similarly, the second intermediary agent specified as a destination of the message details the service list based on the knowledge of the agent, and transmits the service list to the next agent. The third intermediary agent also details the service which cannot be detailed by the second agent.

Thus, the service list partly detailed by the first intermediary agent shown in FIG. 26 is also detailed by the second intermediary agent, and the service list is further detailed by the third intermediary agent.

As described above, by detailing a service list step by step by a plurality of intermediary agents, a detailing process is not concentrated on a specific intermediary agent, thereby avoiding the deterioration of the performance of the entire system. Particularly, when the flow of a process changes, a service can be performed more efficiently by detailing the contents of the service by any of the subsequent agents after the process has started in a process in which a requested service is performed.

For example, when a travel agent process containing a hotel reservation and a flight reservation is performed, and a planning agent receives a service list '* retrieval of travel' at an abstract level as shown in FIG. 27, the service list at the abstract level is detailed into 'retrieving hotel of C company/retrieving flight of B company', and the list is transmitted to a hotel retrieval agent and a flight retrieval agent. Thus, the hotel of C company and the flight of B company can be reserved.

Figure 28:
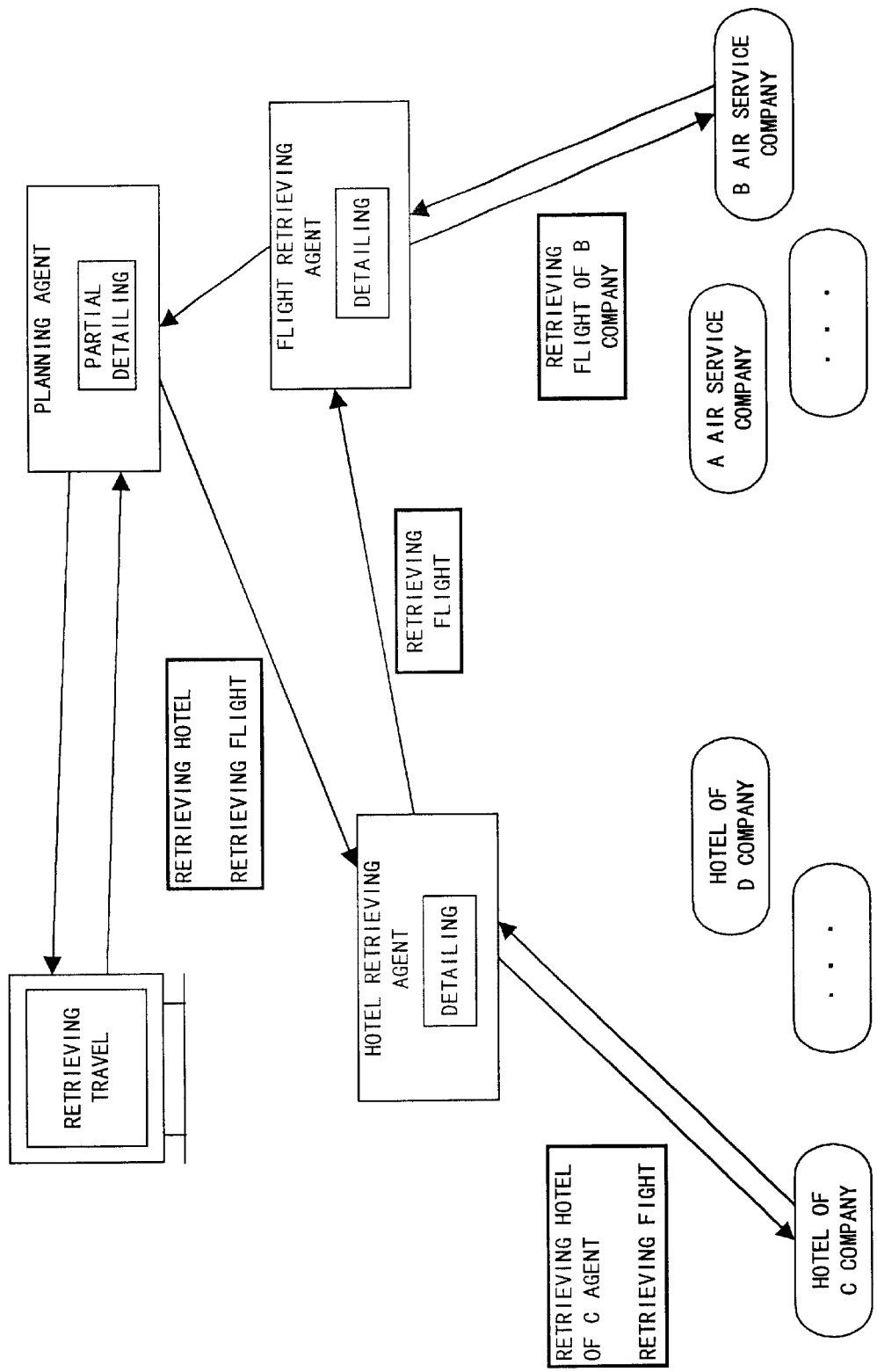
FIG. 28 shows detailing a service list.

Otherwise, as shown in FIG. 28, when the planning agent receives a service list '* retrieval of travel' at an abstract level, the service list at the abstract level is partly detailed into '* retrieving hotel/* retrieving flight'. In response to this, a hotel retrieval agent partly details the list into '* retrieving hotel of C company/* retrieving flight', and retrieves a hotel of C company while a flight retrieval agent retrieves a flight of B company by detailing the list into 'retrieving flight of B company'. Thus, a hotel of C company and a flight of B company can be reserved.

When the above described methods are followed, a plan can be made using a plurality of planning agents having different algorithms, the results can be merged, and the user can be notified of the result of the merge.

Since it is not necessary to detail a service list in a single step according to the present invention, one system can enter another system to use it. Therefore, the knowledge can be distributed, managed, and easily used.

That is, if a part of the knowledge can be obtained, the obtained knowledge can be utilized to detail the service list without knowing all of the knowledge of another system so that the system can be entered, then the service list can be detailed in the system, and the process result can be received through the detailed service list. Thus, since a system can be used without knowing all the knowledge of the system, the knowledge can be managed in a distributed manner and easily used.

Figure 29:
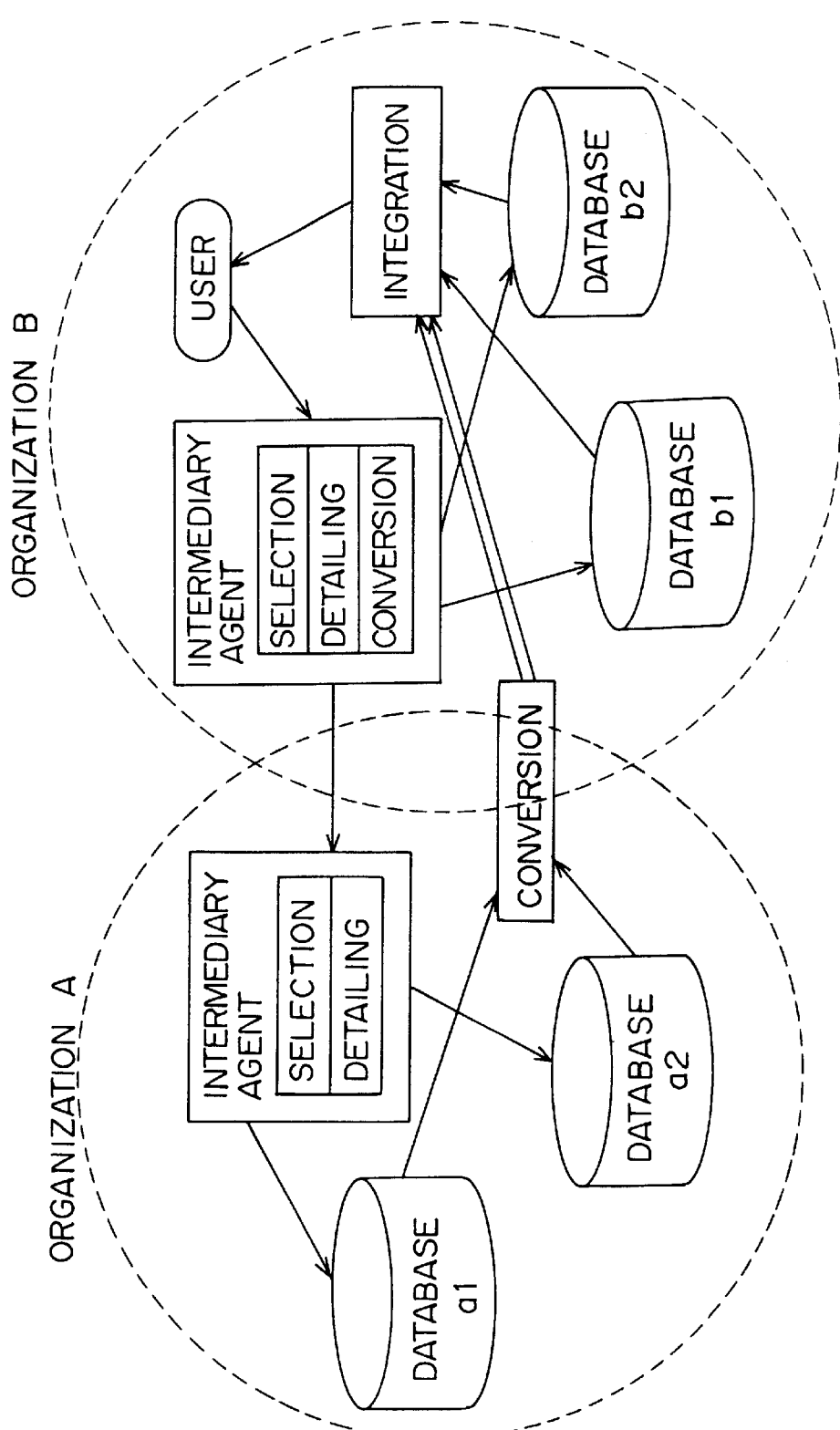
FIG. 29 shows the distribution management of knowledge.

For example, assume that there are the database of an organization A and the database of an organization B as shown in FIG. 29. When an intermediary agent of the organization B does not have the knowledge about the database of the organization A other than the knowledge about the intermediary agent of the organization A, it requests the intermediary agent of the organization A to detail a service list, and receives the process result through the detailed service list, thereby successfully accessing the database of the organization A.

The details of FIG. 29 are described below. The user agent of the organization B transmits a retrieval request message to the intermediary agent of the organization B. At this time, a service is specified to be a retrieval request, and it is not defined to which agent the retrieval request is transmitted.

The intermediary agent of the organization B selects the database agent of the organization B executing a retrieval request. At this time, it also selects the intermediary agent of the organization A. Then, it details each service. For the database agent of the organization B, the detailing process is performed on, for example, 'retrieval→integration→user'. For the intermediary agent of the organization A, the detailing process '* retrieval' is performed at an abstract level. Then, the message having the detailed service list is transmitted to another agent. At this time, the message transmitted to the intermediary agent of the organization A is transmitted after being converted into a format applicable to the knowledge space of the organization A.

Upon receipt of a message from the intermediary agent of the organization B, the intermediary agent of the organization A selects a database agent of the organization A executing a retrieval request based on the service and knowledge, performs, for example, the detailing process such as 'retrieval→conversion→integration→user', etc., and then transmits the message to another agent.

The database of the organization A is retrieved through the detailed service list, and the retrieval result is returned to an integral agent of the organization B through a conversion agent of the organization A. The user operating the user agent of the organization B can retrieve the database of the organization A.

Finally, the distribution of the knowledge according to the present invention is described below.

The intermediary environment through an intermediary agent refers to a powerful approach for connecting different applications. The intermediary environment can be summarized as follows.

An agent is generated corresponding to each application, and the knowledge processed by an agent is modelled. That is, a definition as to what each agent is doing is declared, and a predetermined description about the format of the applicable data and knowledge of the agent is provided.

To realize the access based on a generated model, each agent notifies an intermediary agent of its own function and the method of communicating a message.

According to the notified information, the intermediary agent converts the communications method depending on an agent involved in the communications, and selects a destination agent. Based on the process of each agent, the intermediary agent sets a larger process flow. For example, it generates a process flow such that a message can be first converted and then transmitted to an appropriate agent, and converts a returned message and answers an agent who issued the question. This setting is performed by a prediction or according to preliminary information.

In the above described intermediary environment, communications with other agents require to know the input/output format of the agents, the languages applicable in the agents, etc. as knowledge.

When a model is generated in the above described intermediary environment, similar model spaces (knowledge spaces) may be generated here and there. Therefore, it is necessary to connect the plurality of model spaces. In this case, it is impossible to redesign the entire system. Model spaces are managed by different management units. Therefore, after connecting the model spaces, they can be individually amended.

When model spaces are connected, the function of managing distributed knowledge spaces is required. Model spaces can be connected in various formats. The spaces may be connected in a hierarchical structure, or a space may be suspended in another model space specifically detailed.

The present invention provides a considerably effective means in response to a request to connect the above described distributed model spaces.

That is, the service list used in the present invention can be detailed by the subsequent agents. Therefore, it is not necessary to know all of other model spaces. With only the knowledge about the agent connected to a model agent (agent such as an intermediary agent of the organization A shown in FIG. 29), a message having a service list can be transmitted to the agent. Then, according to the knowledge of the model space, the service list is detailed, thereby possibly entering the model space.

Thus, the present invention connects distributed model spaces without destroying the distribution environment. Consequently, the present invention can be applied to all systems which link software and are connected through a network.

The present invention has been described above by referring to the illustrated embodiments. However, the present invention is not limited to these embodiments. For example, the present invention is not limited to a specific agent, but can be applied to all software products different in message communications method in a distributed environment.

As described above, according to the present invention, a service list defined by a combination of message destination information and message-specified process information is added to a message communicated between software products such as agents distributed through a network. A service list portion processed by the destination software is removed, and the service list-added message is transmitted from a software product to another software product, thus completing the process. As a result, an efficient distribution environment can be generated without charging a specific software product with a heavy load.

According to the present invention, a message can be transmitted in a method not limited to a one-to-one transmission method. When an agent issuing a process request is selected, an entire process covering a plurality of agents can be selected.

When an agent is added, a required step is to enter the addition in an agent such as an intermediary agent. The contents of the compound process performed using the added agent can be only added to the knowledge of the agent such as an intermediary agent. It is not necessary to amend or add contents to other intermediary agents. Therefore, the addition, the amendment, and the related compound process contents can be easily realized.

Then, since the process state of a message can be contained in the message itself, it is not necessary to perform a process of sequentially distributing a message to a plurality of messages by following the process procedure even when it is necessary to follow a complicated process procedure of, for example, transmitting to a plurality of agents. As a result, the functions of an agent can be distributed, and the concentration of a heavy load on one agent can be avoided, and the load can be efficiently distributed.

What is claimed is:

1. An agent in a multiple-agent system, comprising:
generation means for generating and managing in each agent, based upon ontological commitments of agents in the multiple-agent system, a service list defined by a combination of a process flow information specifying operations to be performed by the agents concerning contents of the process specified in a message and agent destination information;
detail means for detailing the service list according to the ontological commitments of the agents in the multiple-agent system by rewriting the process flow information including the process operations and the agent destination information; and transmission means for adding the detailed service list to the message and transmitting the message to another agent using the agent destination information.

2. The agent according to claim 1 wherein:

said generation means generates the service list in a description format at an abstract level in which a part of the process flow information in the service list has not been defined.

3. The agent according to claim 1 wherein:

said generation means generates the service list in a description format at a detail level specifying a process operation to be performed by an agent and destination information of the agent where the process operation is to be performed.

4. The agent according to claim 1 wherein:

said generation means generates the service list in a description format at an abstract level partly including a description format at a detail level.

5. An agent used in a multiple-agent system, comprising:

reception means for receiving a message transmitted from another agent;

extraction means for extracting a service list which is added to the message received by said reception means, and is defined by a combination of destination information about the message and a process flow information specifying operations to be performed by agents in the multiple-agent system concerning contents of the process specified in the message;

detail means for detailing the service list extracted by said extraction means according to ontological commitments of the agents in the multiple-agent system performing the process operations by rewriting the process flow information including the process operations and the destination information; and transmission means for adding the detailed service list to the message and transmitting the message to another agent.

6. The agent according to claim 5 wherein:

said detail means details the extracted service list, if the service list is in a description format at an abstract level, by rewriting the service list at a detail level, which comprises the process flow information specifying a process operation to be performed at an agent and destination information specifying the agent where the process operation is to be performed.

7. The agent according to claim 5 wherein:

said detail means details the extracted service list, if in a description format at an abstract level, by rewriting the service list comprising the process flow information specifying a translating operation translating a word system of a user agent which generates the service list at the abstract level into a word system of an executing agent for performing a process operation, destination information specifying a translating agent for performing the translating operation, and the process flow information specifying the process operation to be performed after the translating operation, and destination information specifying the execution agent for executing the process operation.

8. The agent according to claim 5 wherein:

said detail means copies the message, if a process operation is to be processed by a plurality of agents, and generates for each copied message a service list containing a combination of the process flow information specifying the process operation to be performed, destination information specifying one of the plurality of agents for performing the process operation, and a number of copies of the message.

9. The agent according to claim 5 wherein:

said detail means commits detailing a part-of the service list to an agent not belonging to a knowledge space of a present agent, if a process operation should be performed in a knowledge space to which the present agent does not belong.

10. An agent used in a multiple-agent system, comprising:

reception means for receiving a message transmitted from another agent;

extraction means for extracting a service list which is added to the message received by said reception means, and is defined by a combination of destination information about the message and a process flow information specifying operations to be performed by agents in the multiple-agent system concerning contents of the process specified in the message;

execution means for executing a process operation specified by the process flow information corresponding to the destination information when a leading destination information in the service list extracted by said extraction means specifies a present agent;

detail means for rewriting the service list by deleting from the service list data of the service list relating to the process operation executed by said execution means; and transmission means for adding the rewritten service list to a message comprising an execution result from said execution means as the content of the process, and transmitting the message to another agent.

11. The agent according to claim 10 wherein:

said execution means executes the process operation, specified by the process flow information in the service list after all copies of the message have been received when a number of the copies is recorded in the service list extracted by said extraction means.

12. The agent according to claim 10 wherein:

said execution means merges process results as the content of the process in respective messages after all copies of the message have been received when a number of copies is recorded in the service list extracted by said extraction means.

13. The agent according to claim 10 wherein:

said execution means performs a series of the process operations specified in said service list even when another agent is specified as a destination, if said execution means can process a leading and subsequent one or more pieces of the process operations in the service list; and said deletion means deletes plural combinations of data relating to the process operations performed by said execution means from the service list.

14. The agent according to claim 10, further comprising:

amendment means for amending one or both of the process flow information and the destination information in the service list based on an execution result from said execution means.

15. The agent according to claim 10, further comprising:

determination means for determining whether the message is returned to a present agent by referring to the service list;

removal means for removing and saving the process flow information about a process operation to be performed by the present agent from the service list when the message is returned, if determined by said determination means that the message is returned to the present agent; and return unit for returning the removed and saved process flow information to the service list when the message with the removed and saved process flow information is returned.

16. The agent according to claim 15 wherein:

said removal means further removes and saves the process flow information about a subsequent process operation to be performed by another agent from the service list.

17. The agent according to claim 10, further comprising:

storage means for storing the service list received by said reception means; and control means for resuming the process based on the service list stored in said storage means when the multiple-agent system becomes faulty.

18. The agent according to claim 10, further comprising:

collection means for collecting a state of the process from the service list of a message of an agent subordinate to a present agent.

19. A multiple-agent system comprising:

a first agent comprising:
  generation means for generating a service list defined by a combination of a process flow information specifying operations to be performed by agents in the multiple-agent system concerning contents of the process specified in a message and destination information for the message; and
  transmission means for adding the service list to the message and transmitting the message to another agent;

a second agent comprising:
  reception means for receiving the message transmitted from said first agent;
  extraction means for extracting the service list added to the message received by said reception means;
  detail means for detailing the service list extracted by said extraction means based on ontological commitments of the agents in the multiple-agent system to perform a process operation by rewriting the process flow information including the process operations and the destination information; and
  transmission means for adding the detailed service list to the message and transmitting the message to another agent;

a third agent comprising:
  reception means for receiving the message transmitted from said second agent;
  extraction means for extracting the detailed service list added to the message received from said reception means;
  execution means for executing the process operation of a leading destination information in the detailed service list extracted by said extraction means, if the leading destination information specifies a present agent;
  detail means for rewriting the service list by deleting from the service list the flow information relating to the process operation performed by said execution means; and
  transmission means for adding the rewritten service list to a message comprising an execution result obtained from said execution means as the content of the process, and transmitting the message to another agent.

20. The system according to claim 19 wherein:

said first agent is a user agent for generating the service list in a description format at an abstract level in which a part of the process flow information is undefined;

said second agent is an intermediary agent for detailing the service list at the abstract level transmitted from said first agent by rewriting the service list in a description format at a detail level containing the process flow information specifying the process operation to be performed based on the ontological commitments relating to an execution agent performing the process operation and the destination information specifying the execution agent where the process operation is to be performed; and said third agent is an execution agent, specified by the destination information in the service list at the detail level, for executing the process operation specified by the process flow information.

21. The system according to claim 19 wherein:

said detail means of said second agent details the service list at the abstract level transmitted from said first agent by rewriting the service list at a detail level containing the process flow information specifying a translating operation translating a word system of said first agent into a word system of an execution agent for performing the process operation, based on the ontological commitments of the execution agent, destination information specifying a translation agent for performing the translating operation, the process flow information specifying the process operation to be performed after the translating operation, and the destination information specifying the execution agent for performing the process operation.

22. The system according to claim 19 wherein:

said detail means of said second agent copies the message, if the process operation is to be processed by a plurality of said third agents, and generates for each copied message a service list containing the process flow information specifying the process operation to be performed, the destination information specifying one of the plurality of said third agents for performing the process operation, and a number of copied messages.

23. The system according to claim 22 wherein:

said third agent performs the process operation specified by the process flow information in the detailed service list after all copies of the message have been received, if the number of copies of the message is recorded in the service list.

24. A method of distributing a message communicated between software products through a network, comprising:

adding to the message a service list defined by a combination of destination information about the message and a process flow information specifying operations to be performed by agents on the network concerning contents of the process specified by the message;

transmitting the message to destination software;

rewriting the service list by deleting the flow information relating to a process operation performed by the software from the service list; and distributing the rewritten service list to another destination software to perform another process operation.

25. A method of distributing a message between agents in a multiple-agent system, comprising:

generating a first service list defined by a combination of a user requested process flow information specifying operations to be performed by the agents concerning contents of the user requested process specified in the message and destination information about the message;

adding the first service list to the message and transmitting the message to an agent;

detailing the first service list by rewriting the first service list into a second service list comprising the process flow information specifying a process operation to be performed by a destination agent based on ontological commitments of the agents and destination information specifying the destination agent;

adding the second service list to the message and transmitting the message to the destination agent;

performing the process operation specified as a leading process operation in the second service list;

rewriting the second service list by deleting the process flow information relating to the performed process operation from the second service list; and adding to the message the rewritten second service list and transmitting the message to another agent.

26. The method according to claim 25 wherein the first service list is generated in a description format at an abstract level at which a part of the process flow information in the service list is undefined according to a message from the user; and the detailing of the first service list comprises rewriting the first service list into the second service list at a detail level containing the process flow information specifying the process operation to be performed by the destination agent and destination information specifying the destination agent.

27. The method according to claim 25 wherein the detailing of the first service list comprises copying the message, if the process operation is to be processed by a plurality of the agents, and generating for each copied message the second service list at a detail level containing the process flow information specifying the process operation to be performed, destination information specifying one of the plurality of the agents for performing the process operation, and a number of copied messages; and performing the process operation specified by the process flow information in the second service list after all copies of the messages have been received from the agents, if the number of copies of the message is recorded in the second service list.

28. A computer-readable storage medium storing a process of realizing agents used in a multiple-agent system, the process in each agent comprising:

generating and managing in each agent, based upon ontological commitments of the agents in the multiple-agent system, a service list defined by a combination of agent destination information and a process information concerning contents of the process specified in a message;

detailing the service list according to the ontological commitments of the agents in the multiple-agent system by rewriting the agent destination information and the process information concerning the contents of the process specified in the message; and adding the detailed service list to the message and transmitting the message to another agent using the agent destination information.

29. A computer-readable storage medium storing a process for realizing an agent used in a multiple-agent system, comprising:

receiving a message transmitted from another agent;

extracting a service list added to the message and defined by a combination of destination information about the message and a process flow information specifying operations to be performed by agents in the multiple-agent system concerning contents of the process specified in the message;

detailing the service list according to ontological commitments of the agents in the multiple-agent system performing the process operations by rewriting the process flow information including the process operations and the destination information; and adding the detailed service list to the message and transmitting the message to another agent.

30. A computer-readable storage medium storing a process for realizing an agent used in a multiple-agent system, comprising:

receiving a message transmitted from another agent;

extracting a detailed service list added to the message and defined by a combination of destination information about the message and a process flow information specifying operations to be performed by agents in the multiple-agent system concerning contents of the process specified in the message;

performing a process operation specified by the process flow information corresponding to the destination information when a leading destination information in the extracted detailed service list specifies a present agent;

rewriting the service list by deleting data relating to the performed process operation from the service list; and adding the rewritten service list to a message comprising a result of the performed process operation as the content of the process, and transmitting the message to another agent.

31. An agent in a multiple-agent system, comprising:

a generation unit generating and managing in each agent, based upon ontological commitments of agents in the multiple-agent system, a service list defined by a combination of a process flow information specifying operations to be performed by the agents concerning contents of the process specified in a message and agent destination information;

a detail unit detailing the service list according to the ontological commitments of the agents in the multiple-agent system by rewriting the process flow information including the process operations and the agent destination information; and a transmission unit in communication with the generation unit and adding the detailed service list to the message and transmitting the message to another agent using the agent destination information.

32. An agent used in a multiple-agent system, comprising:

a reception unit receiving a message transmitted from another agent;

an extraction unit in communication with the reception unit and extracting a service list added to the message received by the reception unit and defined by a combination of destination information about the message and a process flow information specifying operations to be performed by agents in the multiple-agent system concerning contents of the process specified in the message;

a detail unit in communication with the extraction unit and detailing the service list extracted by the extraction unit according to ontological commitments of the agents in the multiple-agent system performing the process operations by rewriting the process flow information including the process operations and the destination information; and a transmission unit in communication with the detail unit and adding the detailed service list to the message and transmitting the message to another agent.

33. An agent used in a multiple-agent system, comprising:

a reception unit receiving a message transmitted from another agent;

an extraction unit in communication with the reception unit and extracting a service list added to the message received by the reception unit, the service list defined by a combination of destination information about the message and a process flow information specifying operations to be performed by agents in the multiple-agent system concerning contents of the process specified in the message;

an execution unit in communication with the extraction unit and executing a process operation specified by the process flow information corresponding to the destination information when a leading destination information in the service list extracted by the extraction unit specifies a present agent;

a detail unit in communication with the execution unit and the extraction unit and rewriting the service list by deleting from the service list data of the service list relating to the process operation executed by the execution unit; and a transmission unit in communication with the deletion unit and adding the rewritten service list to a message comprising an execution result from the execution unit as the content of the process, and transmitting the message to another agent.

34. A multiple-agent system comprising:

a first agent comprising:
  a generation unit generating a service list defined by a combination of a process flow information specifying operations to be performed by agents in the multiple-agent system concerning contents of the process specified in a message and destination information for the message, and
  a transmission unit in communication with the generation unit and adding the service list to the message and transmitting the message to another agent;

a second agent comprising:
  a reception unit receiving the message transmitted from said first agent,
  an extraction unit in communication with the reception unit and extracting the service list added to the message received by the reception unit,
  a detail unit in communication with the extraction unit and detailing the service list extracted by the extraction unit based on ontological commitments of the agents in the multiple-agent system to perform a process operation by rewriting the process flow information including the process operations and the destination information, and
  a transmission unit in communication with the detail unit and adding the detailed service list to the message and transmitting the message to another agent; and a third agent comprising:
  a reception unit receiving the message transmitted from said second agent,
  an extraction unit extracting the detailed service list added to the message received from the reception unit,
  an extraction unit in communication with the reception unit and extracting the detailed service list added to the message received from the reception unit,
  an execution unit in communication with the extraction unit and executing the process operation of a leading destination information in the detailed service list extracted by the extraction unit, if the leading destination information specifies a present agent,
  a detail unit in communication with the extraction unit and the execution unit and rewriting the service list by deleting from the service list the process flow information relating to the process operation performed by the execution unit, and
  a transmission unit in communication with the deletion unit and adding the rewritten service list to a message comprising an execution result obtained from the execution unit as the content of the process, and transmitting the message to another agent.

35. A multiple-agent system comprising a user agent, an intermediary agent and a service execution agent, said user agent comprises:
  a generation unit generating a service list defining a process flow information specifying operations to be performed by the agents concerning contents of the process specified in the message and destination information of the message, and
  a transmission unit adding the service list to the message and transmitting the message to another agent, said intermediary agent comprises:
  a reception unit receiving the message with the service list transmitted from said user agent,
  an extraction unit extracting said service list from the received message,
  a detail unit detailing the service list extracted by said extraction unit based on ontological commitments of the agents in the multiple-agent system to perform a process operation specified in the process flow information by rewriting the process flow information including the process operations and the destination information,
  a transmission unit adding the detailed service list to the message and transmitting the message to another agent, and said service execution agent comprises:
  a reception unit receiving the message with the detailed service list,
  an extraction unit extracting said detailed service list from the received message,
  an execution unit executing the process operation of a leading destination information in the detailed service list extracted by said extraction unit, if the leading destination information specifies a present agent,
  a detail unit rewriting the service list by deleting the process flow information corresponding to the process operation executed by said execution unit, and
  a transmission unit adding the rewritten service list to a message comprising a result of the process operation executed by said execution unit and transmitting the message to another agent.

36. A multiple-agent system according to claim 35, wherein said user agent generates the service list at an abstract level service list, in which a part of the process flow information is not defined and transmits the message to the intermediary agent as another agent, and the intermediary agent details the abstract level service list by defining the undefined part of the process flow information based on the ontological commitments of the service execution agent to execute the process operation.

37. A method of distributing messages among agents in a multiple-agent system, comprising:

generating and managing in each agent, based upon ontological commitments of the agents in the multiple agent system, a service list defined by a combination of a process flow information specifying operations to be performed by the agents concerning contents of the process specified in each message and agent destination information corresponding to each process operation;

detailing the service list according to the ontological commitments of the agents in the multiple-agent system by rewriting the process flow information including the process operations and the agent destination information adding the detailed service list to each message; and transmitting each message to another agent using the agent destination information.

38. A multi-agent system, comprising:

a first agent comprising:

a generator generating a service list defined by a combination of a process flow information specifying operations to be performed by agents in the multi-agent system concerning contents of the process specified in a message and destination information of the message; and a transmitter transmitting the message to another agent by attaching the service list to the message; and a second agent comprising:

a receiver receiving the transmitted message with the service list from the first agent;

a detailer detailing the extracted service list by deleting the process flow information of a process operation performed by the second agent and rewriting the process flow information and the destination information of the extracted service list based upon ontological commitments of the agents in the multi-agent system to perform a next process operation in the process flow; and a transmitter transmitting the message with the detailed service list to another agent by attaching the detailed service list to the message.

\* \* \* \* \*